(12) United States Patent
Kuroyanagi et al.

(10) Patent No.: US 9,760,330 B2
(45) Date of Patent: Sep. 12, 2017

(54) INFORMATION PROCESSING DEVICE, DISTRIBUTED PROCESSING METHOD, AND STORAGE MEDIUM

(71) Applicants: Tomohiro Kuroyanagi, Kanagawa (JO); Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Fumiyoshi Kittaka, Kanagawa (JP); Koichiro Maemura, Kanagawa (JP)

(72) Inventors: Tomohiro Kuroyanagi, Kanagawa (JO); Makoto Sasaki, Kanagawa (JP); Junki Aoki, Kanagawa (JP); Takuya Mori, Tokyo (JP); Itaru Kodaira, Kanagawa (JP); Yukinori Ishii, Kanagawa (JP); Hiroaki Ikkanzaka, Tokyo (JP); Fumiyoshi Kittaka, Kanagawa (JP); Koichiro Maemura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 15/062,748

(22) Filed: Mar. 7, 2016

(65) Prior Publication Data

US 2016/0274842 A1    Sep. 22, 2016

(30) Foreign Application Priority Data

Mar. 17, 2015    (JP) .................................. 2015-053897

(51) Int. Cl.
*H04N 1/04*    (2006.01)
*G06F 3/12*    (2006.01)
(Continued)

(52) U.S. Cl.
CPC ............ *G06F 3/1292* (2013.01); *G06F 3/121* (2013.01); *G06F 3/1204* (2013.01); *G06F 3/124* (2013.01);
(Continued)

(58) Field of Classification Search
CPC ........... H04N 1/00347; H04N 1/00411; H04N 1/0092; H04N 1/32523; H04N 1/32539
(Continued)

(56) References Cited

U.S. PATENT DOCUMENTS

2012/0023451 A1    1/2012    Kuroyanagi
2012/0113465 A1    5/2012    Matsuyama et al.
(Continued)

FOREIGN PATENT DOCUMENTS

JP    2012-101381    5/2012

*Primary Examiner* — Houshang Safaipour
(74) *Attorney, Agent, or Firm* — Harness, Dickey & Pierce P.L.C.

(57) ABSTRACT

An information processing device includes: an identification information acquiring unit that acquires, from a mobile terminal having acquired, from a machine, first machine identification information for identifying the machine, mobile terminal identification information for identifying the mobile terminal and the first machine identification information; a job information acquiring unit that acquires, on a basis of the mobile terminal identification information, job information including at least job identification information for identifying a job being executed in another machine according to an instruction from the mobile terminal; an executability determining unit that determines, on a basis of used function information indicating a function to be used in the job, and first capacity information indicating a function executable by the machine, whether the machine (Continued)

can execute the job; and a job control unit that causes, when the job can be executed, the job to be distributed to and executed by the machine.

20 Claims, 15 Drawing Sheets

(51) Int. Cl.
    *H04N 1/00*     (2006.01)
    *H04N 1/32*     (2006.01)

(52) U.S. Cl.
    CPC .......... *G06F 3/1211* (2013.01); *G06F 3/1288* (2013.01); *H04N 1/0092* (2013.01); *H04N 1/00307* (2013.01); *H04N 1/00347* (2013.01); *H04N 1/00411* (2013.01); *H04N 1/32523* (2013.01); *H04N 1/32539* (2013.01); *H04N 1/32641* (2013.01); *H04N 2201/0094* (2013.01)

(58) Field of Classification Search
    USPC ........................................ 358/1.15, 1.14, 1.9
    See application file for complete search history.

(56) References Cited

U.S. PATENT DOCUMENTS

| | | |
|---|---|---|
| 2013/0027736 A1 | 1/2013 | Kittaka |
| 2014/0160530 A1 | 6/2014 | Kittaka |
| 2014/0313539 A1* | 10/2014 | Kawano .................. G06F 21/44 358/1.14 |
| 2014/0362407 A1 | 12/2014 | Sasaki et al. |
| 2015/0271353 A1 | 9/2015 | Nishimura et al. |
| 2015/0286445 A1 | 10/2015 | Kittaka |
| 2016/0255216 A1* | 9/2016 | Saito ..................... G06F 3/1222 |

* cited by examiner

FIG.7

| JOB ID | MAC ADDRESS | USER ID | PRINTING STATUS | PRINT DATA | PRINT-EXECUTING MACHINE ID | NUMBER OF SETS |
|---|---|---|---|---|---|---|
| JOB10035 | AB-CD-12-55-66-77 | suzuki | IN EXECUTION | | MFP0 | 150 |
| JOB10034 | AB-CD-12-55-66-89 | tanaka | IN EXECUTION | | MFP2 | 40 |
| | | | | | MFP3 | 40 |
| JOB10033 | AB-CD-12-55-66-77 | suzuki | COMPLETED | | MFP1 | 45 |
| | | | | | MFP0 | 45 |
| ... | ... | ... | ... | ... | ... | ... |

FIG.8

| JOB ID | COLOR/ MONOCHROME | DUPLEX/ ONE-SIDE | SORTING | STAPLE | PUNCH | NUMBER OF SETS |
|---|---|---|---|---|---|---|
| JOB10035 | COLOR | ONE-SIDE | YES | NO | NO | 150 |
| JOB10034 | MONOCHROME | ONE-SIDE | NO | NO | NO | 80 |
| JOB10033 | COLOR | DUPLEX | NO | NO | NO | 90 |
| ... | ... | ... | ... | ... | ... | ... |

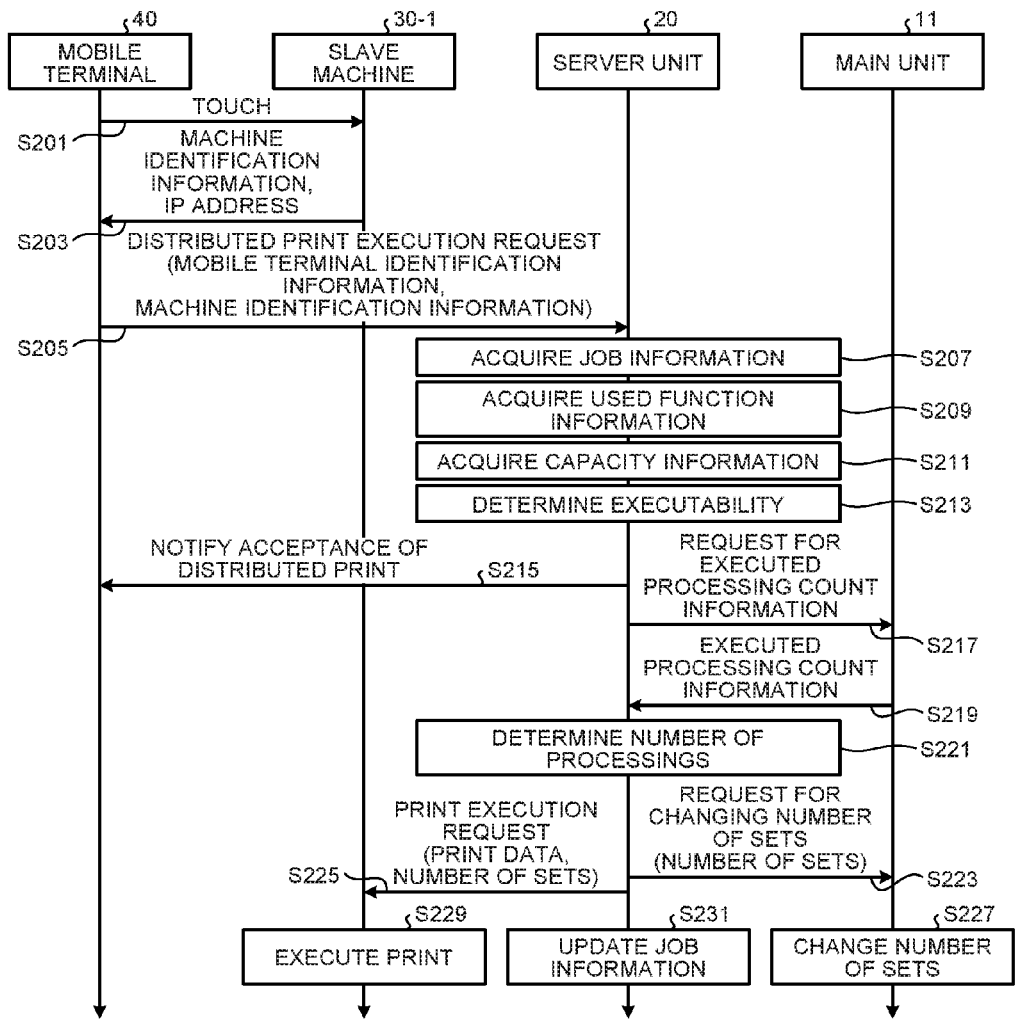

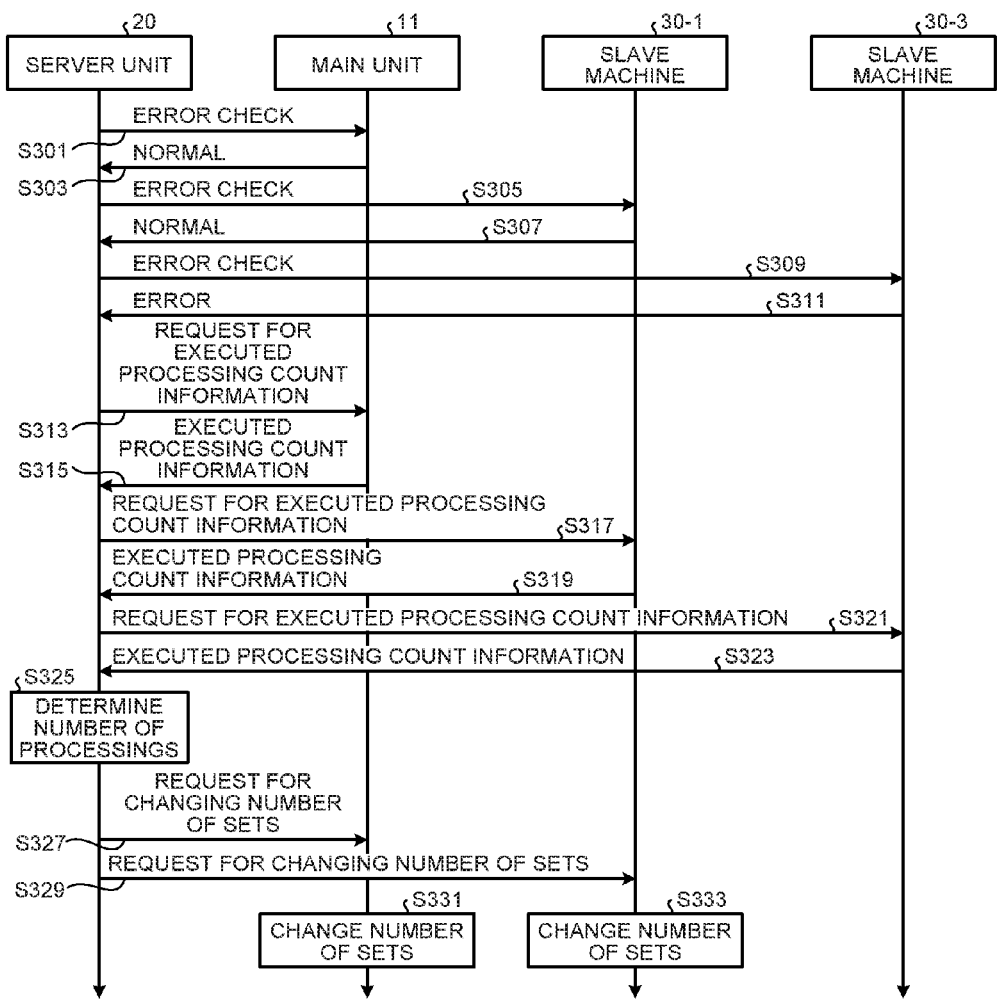

FIG.15

| MACHINE ID | COLOR/ MONOCHROME | DUPLEX/ ONE-SIDE | SORTING | STAPLE | PUNCH | CPU INFORMATION | GENERATION NUMBER |
|---|---|---|---|---|---|---|---|
| MFP0 | COLOR | DUPLEX | YES | YES | YES | 2GHz | 1 |
| MFP1 | COLOR | ONE-SIDE | YES | NO | NO | 1GHz | 2 |
| MFP2 | MONOCHROME | DUPLEX | YES | YES | YES | 1GHz | 3 |
| MFP3 | COLOR | ONE-SIDE | YES | YES | YES | 1GHz | 3 |
| MFP4 | COLOR | DUPLEX | YES | YES | NO | 1GHz | 1 |
| ... | ... | ... | ... | ... | ... | ... | ... |

INFORMATION PROCESSING DEVICE, DISTRIBUTED PROCESSING METHOD, AND STORAGE MEDIUM

CROSS-REFERENCE TO RELATED APPLICATIONS

The present application claims priority to and incorporates by reference the entire contents of Japanese Patent Application No. 2015-053897 filed in Japan on Mar. 17, 2015.

BACKGROUND OF THE INVENTION

1. Field of the Invention

The present invention relates to an information processing device, a distributed processing method, and a storage medium.

2. Description of the Related Art

Techniques for reducing the processing time of a job by allowing a plurality of machines to work in cooperation and distributing the job thereamong so that each can perform the parallel processing of the distributed job have been known in the art. Japanese Laid-open Patent Publication No. 2012-101381, for example, discloses a technique for allowing a job to be distributed to and processed by an image forming device newly added while one or more image forming devices are performing the distributed processing of the job.

According to the conventional techniques as described above, however, an additional operation needs to be performed in an operation panel of the image forming device having instructed the execution of the job in order to newly add another image forming device. Therefore, there is a room for improvement in terms of the ease of operation.

In light of the above, there is a need to provide an information processing device, a distributed processing method, and a storage medium capable of improving the ease of operation when a machine is newly added to perform the distributed processing of a job.

SUMMARY OF THE INVENTION

It is an object of the present invention to at least partially solve the problems in the conventional technology.

An information processing device includes: an identification information acquiring unit that acquires, from a mobile terminal having acquired, from a machine, first machine identification information for identifying the machine by wireless communication, mobile terminal identification information for identifying the mobile terminal and the first machine identification information; a job information acquiring unit that acquires, on a basis of the mobile terminal identification information, job information including at least job identification information for identifying a job being executed in another machine according to an instruction from the mobile terminal; a used function information acquiring unit that acquires, on a basis of the job identification information, used function information indicating a function to be used in the job; a capacity information acquiring unit that acquires, on a basis of the first machine identification information, first capacity information at least indicating a function executable by the machine; an executability determining unit that determines, on a basis of the used function information and the first capacity information, whether the machine can execute the job; and a job control unit that causes, when the job can be executed, the job to be distributed to and executed by the machine.

A distributed processing method includes: acquiring, from a mobile terminal having acquired, from a machine, first machine identification information for identifying the machine by wireless communication, mobile terminal identification information for identifying the mobile terminal and the first machine identification information; acquiring, on a basis of the mobile terminal identification information, job information including at least job identification information for identifying a job being executed in another machine according to an instruction from the mobile terminal; acquiring, on a basis of the job identification information, used function information indicating a function to be used in the job; acquiring, on a basis of the first machine identification information, first capacity information at least indicating a function executable by the machine; determining executability to determine, on a basis of the used function information and the first capacity information, whether the machine can execute the job; and controlling the job to cause, when the job can be executed, the job to be distributed to and executed by the machine.

A non-transitory computer-readable storage medium contains an information processing program. The program causes a computer to execute: acquiring, from a mobile terminal having acquired, from a machine, first machine identification information for identifying the machine by wireless communication, mobile terminal identification information for identifying the mobile terminal and the first machine identification information; acquiring, on a basis of the mobile terminal identification information, job information including at least job identification information for identifying a job being executed in another machine according to an instruction from the mobile terminal; acquiring, on a basis of the job identification information, used function information indicating a function to be used in the job; acquiring, on a basis of the first machine identification information, first capacity information at least indicating a function executable by the machine; determining executability to determine, on a basis of the used function information and the first capacity information, whether the machine can execute the job; and controlling the job to cause, when the job can be executed, the job to be distributed to and executed by the machine.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram illustrating an example of job information stored in a job information storing unit according to this embodiment;

FIG. 8 is a diagram illustrating an example of used function information stored in a used function information storing unit according to this embodiment;

FIG. 9 is a sequence diagram illustrating an example of an operation of causing a print job to be distributed to and parallel-processed by the slave machine according to this embodiment;

FIG. 10 is a diagram illustrating an example of capacity information stored in a capacity information storing unit according to this embodiment;

FIG. 11 is a diagram illustrating an example of job information stored in a job information storing unit according to a modified example 1;

FIG. 12 is a sequence diagram illustrating an example of a job redistributing operation upon the occurrence of an error according to the modified example 1;

FIG. 15 is a diagram illustrating an example of capacity information stored in a capacity information storing unit according to a modified example 4;

DETAILED DESCRIPTION OF THE PREFERRED EMBODIMENTS

An information processing device, a distributed processing method, and a storage medium according to an embodiment of the present invention will now be described below in detail with reference to the accompanying drawings.

Figure 1:
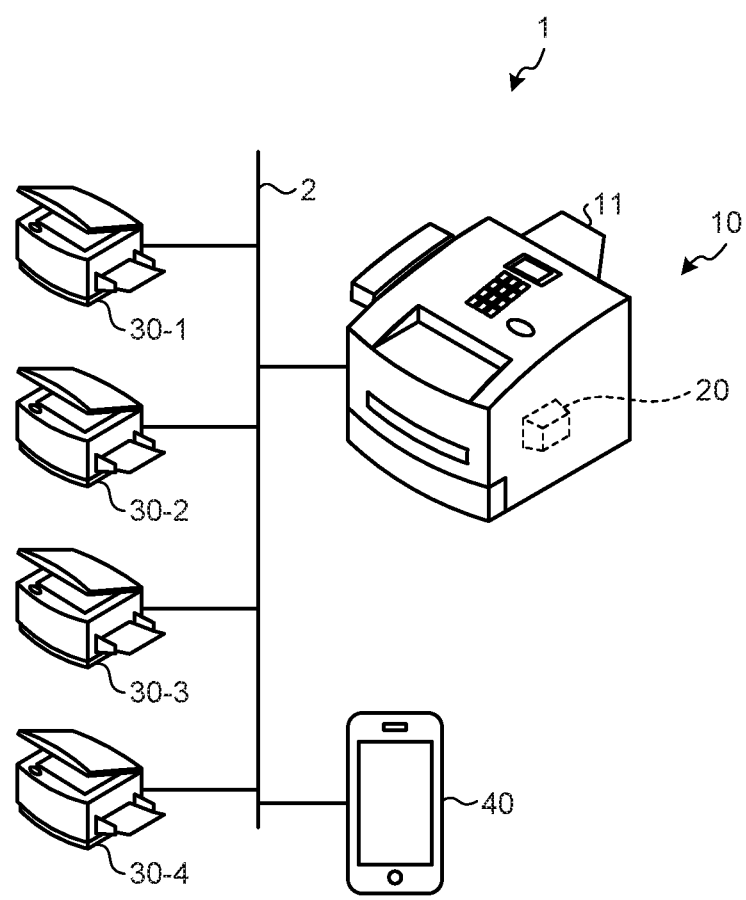
FIG. 1 is a schematic diagram illustrating an example of a distributed processing system according to this embodiment.

FIG. 1 is a schematic diagram illustrating an example of a distributed processing system 1 according to this embodiment. As illustrated in FIG. 1, the distributed processing system 1 includes a master machine 10 and slave machines 30-1 to 30-4 (which are an example of a machine and one or more other machines) as well as a mobile terminal 40. The master machine 10, the slave machines 30-1 to 30-4, and the mobile terminal 40 are connected to one another via a network 2. Examples of the network 2 include a local area network (LAN) and the Internet.

In the following description, when the slave machines 30-1 to 30-4 have no need to be distinguished from one another, the slave machines 30-1 to 30-4 may be referred to simply as slave machines 30. Although FIG. 1 illustrates, as an example, the case of four slave machines 30, the number of the slave machines 30 is not limited thereto. Any number of the slave machines 30 may be present as long as the number is greater than or equal to 1.

Examples of the slave machine 30 include, but are not limited to, image forming devices such as printers, copiers, multifunction peripherals (MFPs), scanners, and facsimile machines. Although this embodiment is described with reference to, as an example, a case where the slave machine 30 is a multifunction peripheral, the slave machine 30 is not limited thereto.

The mobile terminal 40 is a terminal device owned by a user. Examples of the mobile terminal 40 include smart devices such as smartphones and tablet terminals.

Examples of the master machine 10 include, but are not limited to, image forming devices such as printers, copiers, multifunction peripherals, scanners, and facsimile machines. Although this embodiment is described with reference to, as an example, a case where the master machine 10 is a multifunction peripheral, the master machine 10 is not limited thereto.

In this embodiment, the master machine 10 includes a main unit 11 (an example of one or more other machines) and a server unit 20 (an example of an information processing device). The components of the master machine 10 as a multifunction peripheral are included in the main unit 11. The operations of the master machine 10 as a multifunction peripheral are executed by the main unit 11.

According to this first embodiment, the server unit 20 is a small board-like server. Here, although the server unit 20 is built into the master machine 10 and internally connected to the main unit 11, the server unit 20 is not limited thereto. It is only required that the server unit 20 is connected to the main unit 11. The server unit 20 may be connected to the main unit 11 either internally or externally.

The server unit 20 allows at least two or more of the main unit 11 and the slave machines 30-1 to 30-4 to work in cooperation, and distributes a job thereamong so that each can perform the parallel processing of the distributed job.

Figure 2:
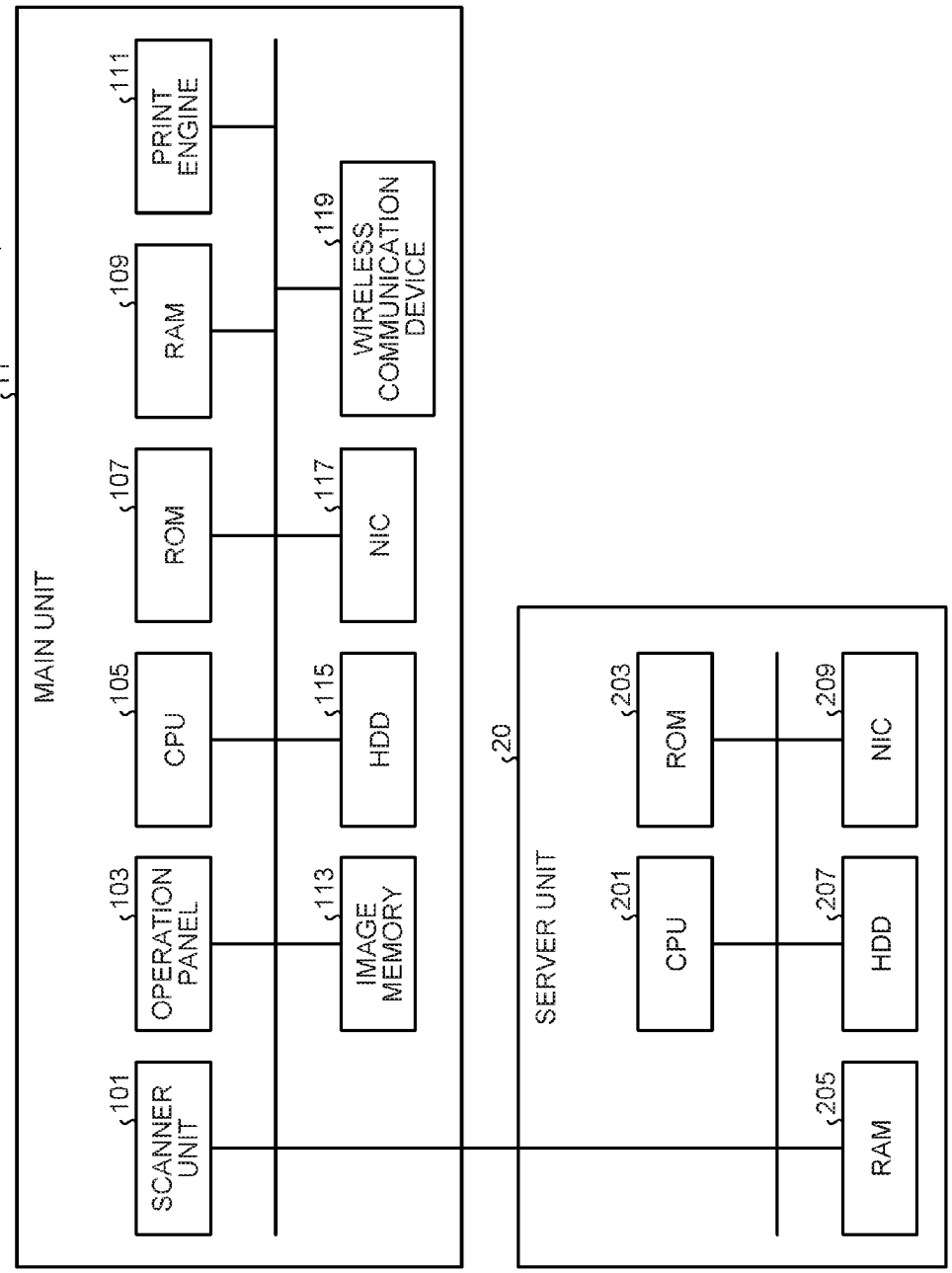
FIG. 2 is a block diagram illustrating an example of the hardware configuration of a master machine according to this embodiment.

FIG. 2 is a block diagram illustrating an example of the hardware configuration of the master machine 10 according to this embodiment. As illustrated in FIG. 2, the main unit 11 and the server unit 20 in the master machine 10 are connected to each other via a bus. The main unit 11 includes: a scanner unit 101; an operation panel 103; a central processing unit (CPU) 105; a read only memory (ROM) 107; a random access memory (RAM) 109; a print engine 111; an image memory 113; a hard disk drive (HDD) 115; a network interface controller (NIC) 117; and a wireless communication device 119. The server unit 20 includes: a CPU 201; a ROM 203; a RAM 205; an HDD 207; and an NIC 209. Note however that the hardware configuration of the master machine 10 in FIG. 2 is given by way of example only and the hardware configuration of the master machine 10 is not limited thereto.

The scanner unit 101 electronically reads a document placed on a platen to generate image data. The print engine 111 prints out the image data. The image memory 113 is a memory for storing the image data generated by the scanner unit 101 and the image data to be printed out by the print engine 111.

The NIC 117 is a communication interface used for communication via the network 2. The wireless communication device 119 is a communication interface used for short-range wireless communication such as Bluetooth (registered trademark) or near field communication (NFC). The operation panel 103 includes: a liquid crystal display (LCD) for displaying screens; a light emitting diode (LED) for indicating a status; a buzzer; a hardware key; and a touch panel. The operation panel 103 displays a variety of information on the LCD and accepts the inputs of a variety of information from the hardware key and the touch panel.

The ROM 107 stores, for example, programs to be executed by the CPU 105. The RAM 109 is used as a working area of the CPU 105. The HDD 115 stores a variety of data to be used by the CPU 105. The CPU 105 executes the programs stored in the ROM 107 on the RAM 109 to control, for example, the scanner unit 101, the operation panel 103, the print engine 111, the image memory 113, the HDD 115, the NIC 117, and the wireless communication device 119 connected to one another via the bus.

The NIC 209 is a communication interface used for communication via the network 2. The ROM 203 stores, for example, programs to be executed by the CPU 201. The RAM 205 is used as a working area of the CPU 201. The HDD 207 stores a variety of data to be used by the CPU 201. The CPU 201 executes the programs stored in the ROM 203 on the RAM 205 to implement the function of causing the main unit 11 and the slave machine 30 to work in cooperation and distributing a job thereamong so that each can perform the parallel processing of the distributed job.

Figure 3:
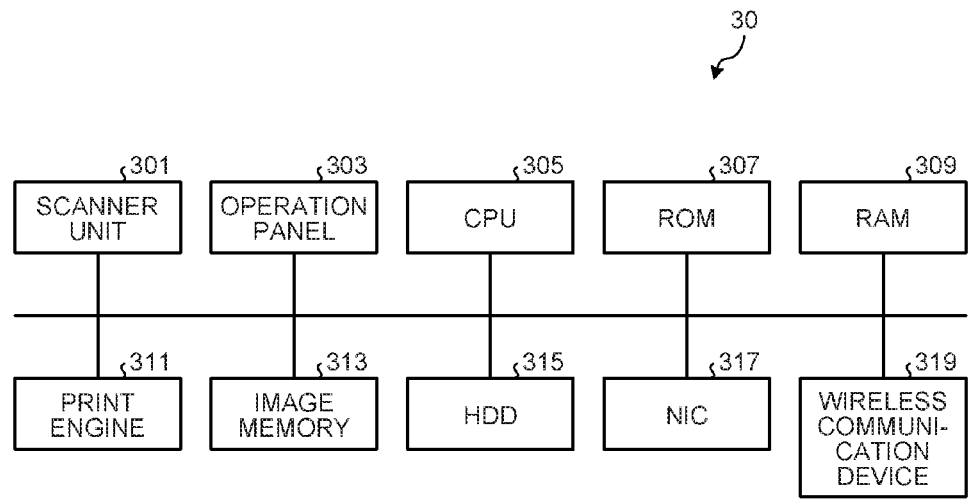
FIG. 3 is a block diagram illustrating an example of a hardware configuration of a slave machine according to this embodiment.

FIG. 3 is a block diagram illustrating an example of the hardware configuration of the slave machine 30 according to this embodiment. As illustrated in FIG. 3, the slave machine 30 includes: a scanner unit 301; an operation panel 303; a CPU 305; a ROM 307; a RAM 309; a print engine 311; an image memory 313; an HDD 315; an NIC 317; and a wireless communication device 319. Note however that the hardware configuration of the slave machine 30 in FIG. 3 is given by way of example only and the hardware configuration of the slave machine 30 is not limited thereto.

The scanner unit 301 electronically reads a document placed on a platen to generate image data. The print engine 311 prints out the image data. The image memory 313 is a memory for storing the image data generated by the scanner unit 301 and the image data to be printed out by the print engine 311.

The NIC 317 is a communication interface used for communication via the network 2. The wireless communication device 319 is a communication interface used for short-range wireless communication such as Bluetooth or NFC. The operation panel 303 includes: an LCD for displaying screens; an LED for indicating a status; a buzzer; a hardware key; and a touch panel. The operation panel 303 displays a variety of information on the LCD and accepts the inputs of a variety of information from the hardware key and the touch panel.

The ROM 307 stores, for example, programs to be executed by the CPU 305. The RAM 309 is used as a working area of the CPU 305. The HDD 315 stores a variety of data to be used by the CPU 305. The CPU 305 executes the programs stored in the ROM 307 on the RAM 309 to control, for example, the scanner unit 301, the operation panel 303, the print engine 311, the image memory 313, the HDD 315, the NIC 317, and the wireless communication device 319 connected to one another via a bus.

Figure 4:
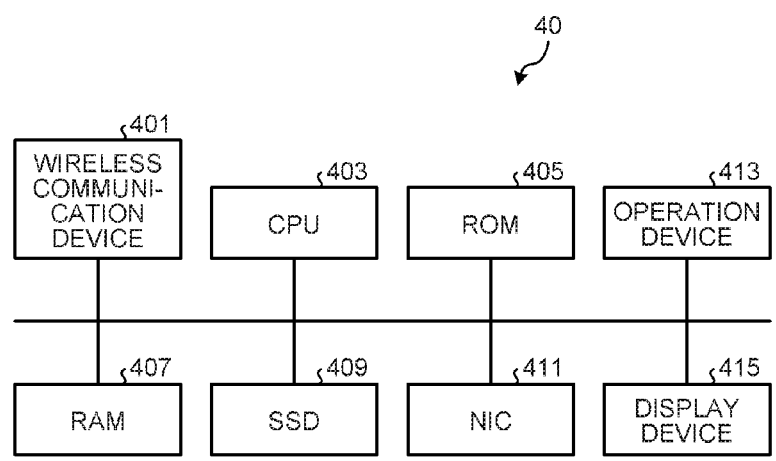
FIG. 4 is a block diagram illustrating an example of a hardware configuration of a mobile terminal according to this embodiment.

FIG. 4 is a block diagram illustrating an example of the hardware configuration of the mobile terminal 40 according to this embodiment. As illustrated in FIG. 4, the mobile terminal 40 includes: a wireless communication device 401; a CPU 403; a ROM 405; a RAM 407; a solid state drive (SSD) 409; an NIC 411; an operation device 413; and a display device 415. Note however that the hardware configuration of the mobile terminal 40 in FIG. 4 is given by way of example only and the hardware configuration of the mobile terminal 40 is not limited thereto.

The NIC 411 is a communication interface used for communication via the network 2. The wireless communication device 401 is a communication interface used for short-range wireless communication such as Bluetooth or NFC. The operation device 413, such as a touch panel, is used for providing various operational inputs. The display device 415, such as a display, displays a variety of information.

The ROM 405 stores, for example, programs to be executed by the CPU 403. The RAM 407 is used as a working area of the CPU 403. The SSD 409 stores a variety of data to be used by the CPU 403. The CPU 403 executes the programs stored in the ROM 405 on the RAM 407 to enable various operations.

Figure 5:
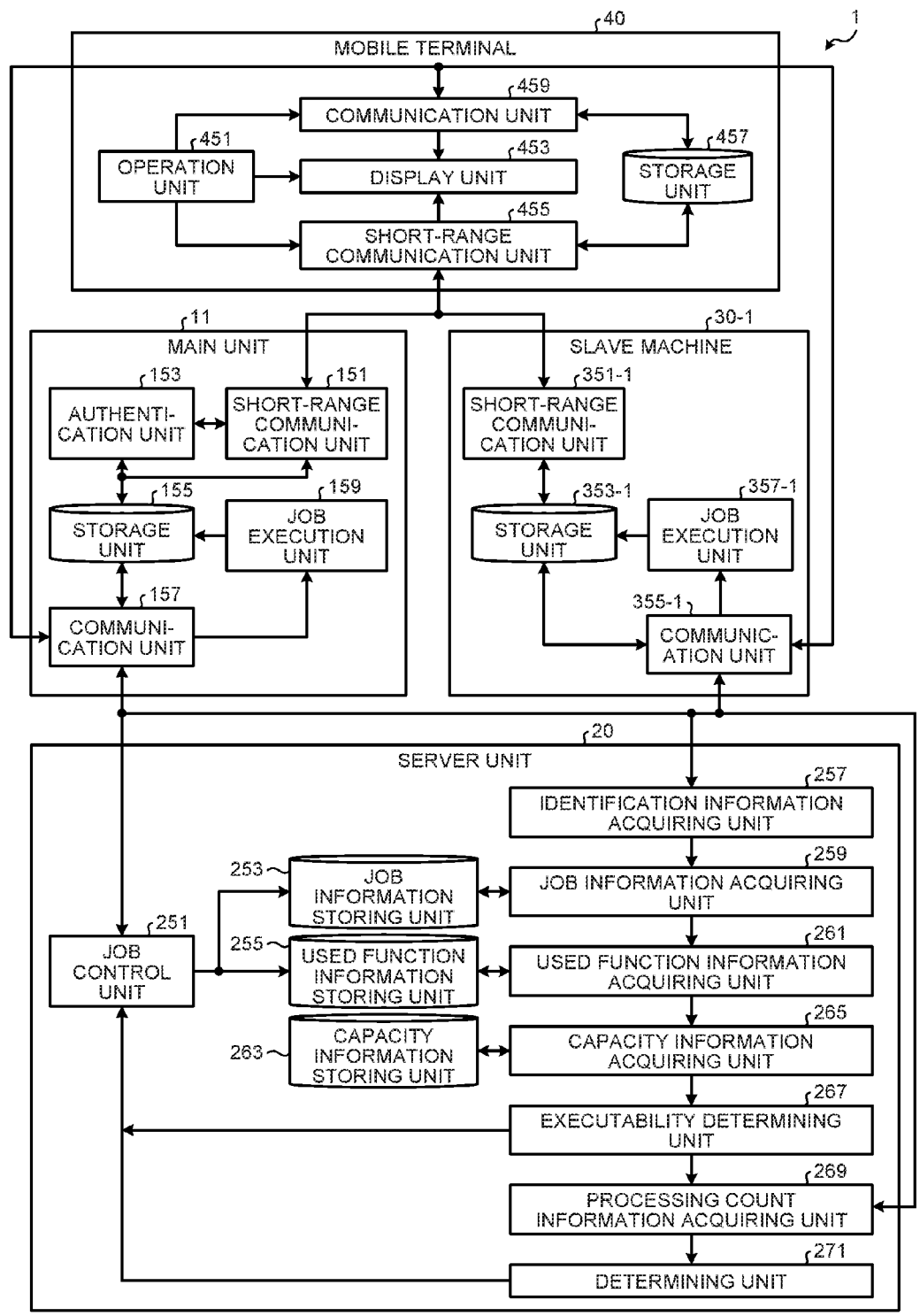
FIG. 5 is a block diagram illustrating an example of a functional configuration of a main unit, a server unit, a slave machine, and a mobile terminal according to this embodiment.

FIG. 5 is a block diagram illustrating an example of the functional configuration of the main unit 11, the server unit 20, the slave machine 30-1, and the mobile terminal 40 according to this embodiment. As illustrated in FIG. 5, the main unit 11 includes: a short-range communication unit 151; an authentication unit 153; a storage unit 155; a communication unit 157; and a job execution unit 159. Note however that the functional configuration of the main unit 11 is not limited thereto.

The short-range communication unit 151 can be constituted by, for example, the CPU 105, the RAM 109, and the wireless communication device 119. The authentication unit 153 can be constituted by, for example, the CPU 105, the RAM 109, and the HDD 115. The storage unit 155 can be constituted by, for example, the HDD 115. The communication unit 157 can be constituted by, for example, the CPU 105, the RAM 109, and the NIC 117. The job execution unit 159 can be constituted by, for example, the scanner unit 101, the CPU 105, the RAM 109, and the print engine 111.

As illustrated in FIG. 5, the server unit 20 includes: a job control unit 251; a job information storing unit 253; a used function information storing unit 255; an identification information acquiring unit 257; a job information acquiring unit 259; a used function information acquiring unit 261; a capacity information storing unit 263; a capacity information acquiring unit 265; an executability determining unit 267; a processing count information acquiring unit 269; and a determining unit 271. Note however that the functional configuration of the server unit 20 is not limited thereto.

The job control unit 251 and the identification information acquiring unit 257 can be constituted by, for example, the CPU 201, the RAM 205, and the NIC 209. The job information storing unit 253, the used function information storing unit 255, and the capacity information storing unit 263 can be constituted by, for example, the HDD 207. The job information acquiring unit 259, the used function information acquiring unit 261, the capacity information acquiring unit 265, the executability determining unit 267, the processing count information acquiring unit 269, and the determining unit 271 can be constituted by, for example, the CPU 201 and the RAM 205.

As illustrated in FIG. 5, the slave machine 30-1 includes: a short-range communication unit 351-1; a storage unit 353-1; a communication unit 355-1; and a job execution unit 357-1. Note however that the functional configuration of the slave machine 30-1 is not limited thereto. The slave machines 30-2 to 30-4 also have the same functional configuration as the slave machine 30-1, although the description thereof will be omitted.

The short-range communication unit 351-1 can be constituted by, for example, the CPU 305, the RAM 309, and the wireless communication device 319. The storage unit 353-1 can be constituted by, for example, the HDD 315. The communication unit 355-1 can be constituted by, for example, the CPU 305, the RAM 309, and the NIC 317. The job execution unit 357-1 can be constituted by, for example, the CPU 305, the RAM 309, and the print engine 311.

As illustrated in FIG. 5, the mobile terminal 40 includes: an operation unit 451; a display unit 453; a short-range communication unit 455: a storage unit 457; and a communication unit 459. Note however that the functional configuration of the mobile terminal 40 is not limited thereto.

The operation unit 451 can be constituted by, for example, the operation device 413. The display unit 453 can be constituted by, for example, the display device 415. The short-range communication unit 455 can be constituted by, for example, the CPU 403, the RAM 407, and the wireless communication device 401. The storage unit 457 can be constituted by, for example, the SSD 409. The communication unit 459 can be constituted by, for example, the CPU 403, the RAM 407, and the NIC 411.

Taking a copying operation as an example, the following will describe a case where: the main unit 11 is first caused to start the print processing (hereinafter, also referred to as "print job") of print data generated by reading a document by the main unit 11; the slave machine 30-1 is then joined to work in cooperation with the main unit 11; and the print job is distributed also to the slave machine 30-1 so that the slave machine 30-1 can perform the parallel processing of the distributed print job. However, the present invention can be applied also to a normal printing operation without being limited thereto.

Figure 6:
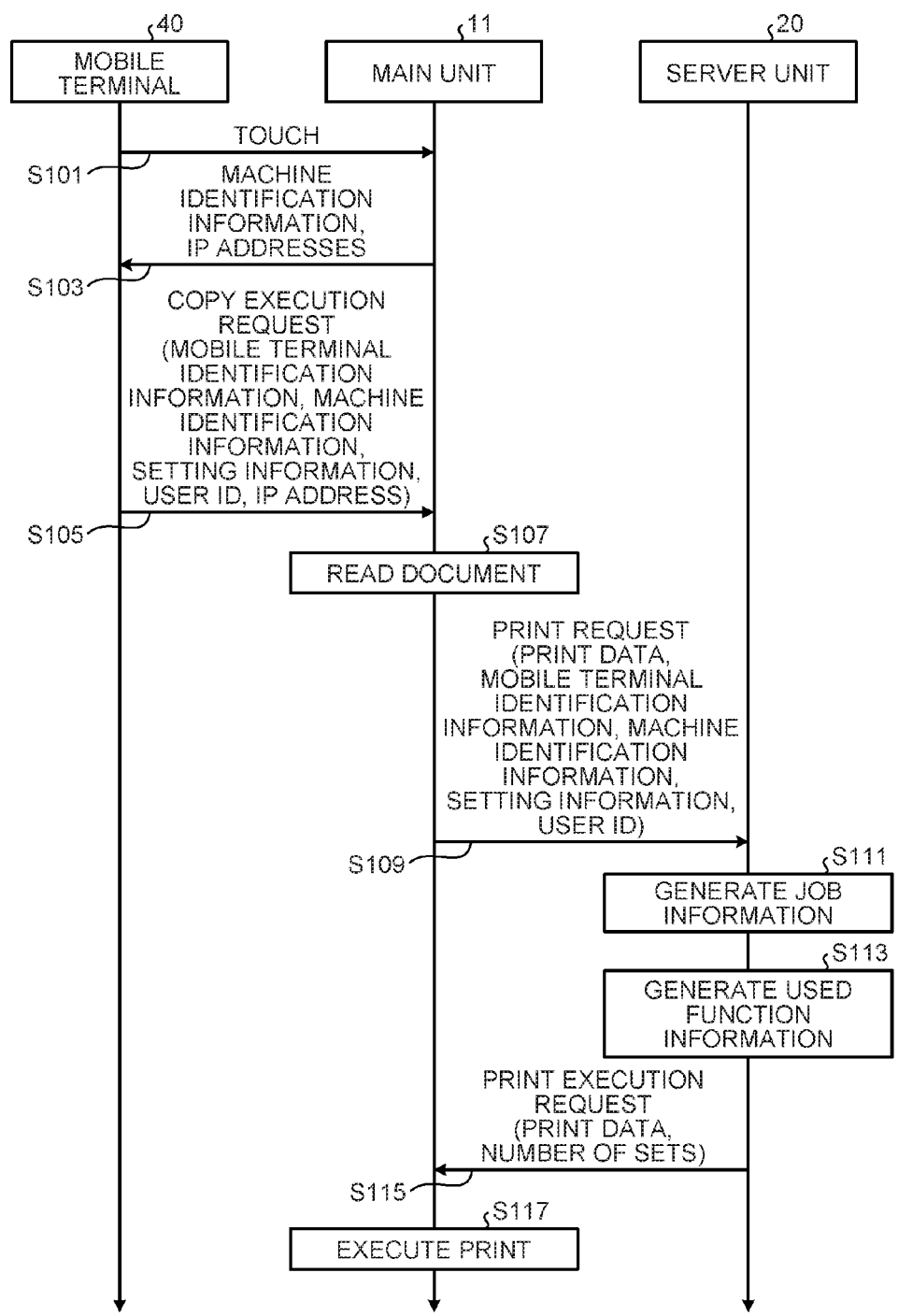
FIG. 6 is a sequence diagram illustrating an example of an operation of causing the main unit to start a print job according to this embodiment.

An operation of causing the main unit 11 to start a print job will be described first. FIG. 6 is a sequence diagram illustrating an example of the operation of causing the main unit 11 to start a print job according to this embodiment.

First, the operation unit 451 of the mobile terminal 40 activates, according to a user's operation, an application for operating machines. This causes the display unit 453 of the mobile terminal 40 to display an authentication information entry screen. The operation unit 451 receives, according to a user's operation, input of a user ID and a password for identifying the user who uses the mobile terminal 40.

When the user brings the mobile terminal 40 closer to the main unit 11 (or the mobile terminal 40 touches the main unit 11) so that the mobile terminal 40 is present within a range where the main unit 11 can perform short-range wireless communication, the short-range communication unit 455 of the mobile terminal 40 performs short-range wireless communication with the main unit 11 to transmit the user ID and the password input from the operation unit 451 to the main unit 11 (step S101).

If the short-range communication unit 151 of the main unit 11 receives the user ID and the password from the mobile terminal 40, the authentication unit 153 of the main unit 11 authenticates the user ID and the password received by the short-range communication unit 151 using account information stored in the storage unit 155. In case of successful authentication by the authentication unit 153, the short-range communication unit 151 acquires, from the storage unit 155, machine identification information of the main unit 11, the IP address of the main unit 11, and the IP address of the server unit 20. The short-range communication unit 151 transmits such information to the mobile terminal 40. Note that the machine identification information of the main unit 11, the IP address of the main unit 11, and the IP address of the server unit 20 are stored in advance in the storage unit 155 in this embodiment.

If the transmitted user ID and password are successfully authenticated in the main unit 11 as described above, the short-range communication unit 455 acquires, from the main unit 11, the machine identification information for identifying the main unit 11 (an example of second machine identification information), the IP address of the main unit 11, and the IP address of the server unit 20. The short-range communication unit 455 then stores such information in the storage unit 457 (step S103).

Although this embodiment is described with reference to, as an example, a case where the machine identification information is a machine ID, the machine identification information is not limited thereto. The machine identification information may be a media access control (MAC) address, a serial number, or an IP address. Note that when the machine identification information is an IP address, no IP address of the main unit 11 needs to be acquired separately.

If the machine identification information of the main unit 11, etc., are acquired by the short-range communication unit 455, the display unit 453 displays a menu screen. The operation unit 451 then receives input of setting information, which indicates the setting of a copy, as well as an execution instruction of the copy according to a user's operation. Although the setting information at least includes color printing or monochrome printing, duplex printing or one-side printing, with or without sorting, with or without a staple, with or without a punch, and the number of sets in this embodiment, the setting information is not limited thereto.

If the execution instruction of the copy is input from the operation unit 451, the communication unit 459 of the mobile terminal 40 acquires, from the storage unit 457, mobile terminal identification information for identifying the mobile terminal 40, the machine identification information of the main unit 11, the IP address of the main unit 11, and the IP address of the server unit 20. Note that the mobile terminal identification information is stored in advance in the storage unit 457 in this embodiment. Moreover, although this embodiment is described with reference to, as an example, a case where the mobile terminal identification information is a MAC address, the mobile terminal identification information is not limited thereto. The mobile terminal identification information may be a serial number or an IP address.

On the basis of the IP address of the main unit 11, the communication unit 459 transmits, to the main unit 11, a copy execution request including the mobile terminal identification information of the mobile terminal 40, the machine identification information of the main unit 11, the setting information, the user ID of the user who uses the mobile terminal 40, and the IP address of the server unit 20 (step S105).

If the communication unit 157 of the main unit 11 receives the copy execution request from the mobile terminal 40, the job execution unit 159 of the main unit 11 electronically reads a document placed on the platen, and stores, in the storage unit 155, print data including image data for each page constituting the document (step S107). The communication unit 157 then acquires the print data from the storage unit 155 and transmits, to the server unit 20, a print request including the print data, the mobile terminal identification information of the mobile terminal 40, the machine identification information of the main unit 11, the setting information, and the user ID of the user who uses the mobile terminal 40 on the basis of the IP address of the server unit 20 included in the received copy execution request (step S109).

If the job control unit receives the print request from the main unit 11, the job control unit 251 of the server unit 20 generates job information on the basis of the print request and stores the job information in the job information storing unit 253 (step S111). The job control unit 251 also generates used function information and stores the used function information in the used function information storing unit 255 (step S113).

The job information includes, but is not limited to, job identification information for identifying the print job based on the print request, the mobile terminal identification information of the mobile terminal 40, the user ID of the user who uses the mobile terminal 40, the machine identification information of the main unit 11, the number of sets included in the setting information, and the print data.

FIG. 7 is a diagram illustrating an example of the job information stored in the job information storing unit 253 according to this embodiment. Although the job information includes a job ID, a MAC address, a user ID, a printing status, print data, a print-executing machine ID, and the number of sets in the example shown in FIG. 7, the job information is not limited thereto. In the example shown in FIG. 7, the job identification information for identifying the print job based on the print request corresponds to the job ID, the mobile terminal identification information of the mobile terminal 40 corresponds to the MAC address, and the machine identification information of the main unit 11 corresponds to the print-executing machine ID. Note that the printing status indicates "in execution" during the generation of the job information.

The job information generated in this sequence diagram is the one regarding the job ID "JOB10035," i.e., the mobile terminal identification information (MAC address) of the mobile terminal 40 being "AB-CD-12-55-66-77" and the machine identification information (the machine ID or the print-executing machine ID) of the main unit 11 being "MFP0." However, the job information is not limited thereto.

The used function information includes, but is not limited to, the job identification information for identifying the print job based on the print request as well as the setting information. FIG. 8 is a diagram illustrating an example of the used function information stored in the used function information storing unit 255 according to this embodiment. Although the used function information includes a job ID, color printing or monochrome printing, duplex printing or one-side printing, with or without sorting, with or without a staple, with or without a punch, and the number of sets in the example shown in FIG. 8, the used function information is not limited thereto. Although the used function information generated in this sequence diagram is the job information regarding the job ID "JOB10035," the used function information is not limited thereto.

The job control unit 251 then transmits, to the main unit 11, a print execution request including the print data and the number of sets in the generated job information (step S115). If the communication unit 157 of the main unit 11 receives the print execution request from the server unit 20, the job execution unit 159 generates executed processing count information, indicating the number of sets having been printed, while executing the print job of printing the print data for the number of sets (step S117). The job execution unit 159 then stores the executed processing count information in the storage unit 155.

An operation of allowing the slave machine 30-1 to work in cooperation and causing a print job to be distributed to and parallel-processed by the slave machine 30-1 will be described next. FIG. 9 is a sequence diagram illustrating an example of the operation of causing a print job to be distributed to and parallel-processed by the slave machine 30-1 according to this embodiment.

First, the operation unit 451 of the mobile terminal 40 activates, according to a user's operation, the application for operating machines. If the display unit 453 displays the menu screen, the operation unit 451 receives, according to a user's operation, input of the execution instruction of distributed print. When the user brings the mobile terminal 40 closer to the slave machine 30-1 (or the mobile terminal 40 touches the slave machine 30-1) so that the mobile terminal 40 is present within a range where the slave machine 30-1 can perform short-range wireless communication, the short-range communication unit 455 performs short-range wireless communication with the slave machine 30-1 (step S201).

If the short-range wireless communication is established by the mobile terminal 40, the short-range communication unit 351-1 of the slave machine 30-1 acquires, from the storage unit 353-1, machine identification information for identifying the slave machine 30-1 (an example of first machine identification information) and the IP address of the server unit 20. The short-range communication unit 351-1 then transmits such information to the mobile terminal 40. Note that the machine identification information of the slave machine 30-1 and the IP address of the server unit 20 are stored in advance in the storage unit 353-1 in this embodiment.

If the short-range communication unit 455 receives, from the slave machine 30-1, the machine identification information of the slave machine 30-1 and the IP address of the server unit 20, the short-range communication unit 455 stores the received information in the storage unit 457 (step S203). The communication unit 459 then acquires, from the storage unit 457, the mobile terminal identification information of the mobile terminal 40, the machine identification information of the slave machine 30-1, and the IP address of the server unit 20. On the basis of the IP address of the server unit 20, the communication unit 459 transmits, to the server unit 20, a distributed print execution request including the mobile terminal identification information of the mobile terminal 40 and the machine identification information of the slave machine 30-1 (step S205).

The identification information acquiring unit 257 of the server unit 20 receives the distributed print execution request from the mobile terminal 40. In other words, the identification information acquiring unit 257 acquires, from the mobile terminal 40, the mobile terminal identification information of the mobile terminal 40 and the machine identification information of the slave machine 30-1.

If the identification information acquiring unit 257 receives the distributed print execution request, the job information acquiring unit 259 of the server unit 20 acquires job information at least including the job identification information of a job being executed in a machine different from the slave machine 30-1 according to an instruction by the mobile terminal 40 on the basis of the mobile terminal identification information of the mobile terminal 40 included in the distributed print execution request (step S207).

For example, assume a case where the job information is the one shown in FIG. 7, the mobile terminal identification information (MAC address) of the mobile terminal 40 is "AB-CD-12-55-66-77," and the machine identification information of the slave machine 30-1 (the machine ID or the print-executing machine ID) is "MFP1." In this case, since the job information satisfying that its MAC address is the same as the MAC address of the mobile terminal 40, its print-executing machine ID is different from the machine ID of the slave machine 30-1, and its printing status indicates "in execution" is the job information of the job ID "JOB10035," the job information acquiring unit 259 acquires the job information of the job ID "JOB10035" from the job information storing unit 253.

Note that the user ID may be used instead of the MAC address in the above-described determination. In this embodiment, search to acquire job information is performed in the order starting from the latest job. When appropriate job information is found, the search is ended and then the job information is acquired. Thus, the distributed print execution request received by the identification information acquiring unit 257 can be construed as the distributed print execution request for the latest job. However, the distributed print execution request is not limited thereto. If no appropriate job information is present and thus can be obtained, such processing is ended.

If the job information acquiring unit 259 acquires the job information, the used function information acquiring unit 261 acquires, based on the job identification information of the acquired job information, used function information indicating functions to be used in the job indicated by such identification information (step S209).

When the job ID of the job information acquired by the job information acquiring unit 259 is "JOB10035" and the used function information is the one shown in FIG. 8, the used function information acquiring unit 261 acquires, from the used function information storing unit 255, the used function information of the job ID "JOB10035."

The capacity information storing unit 263 of the server unit 20 stores capacity information indicating at least executable functions for each machine. FIG. 10 is a diagram illustrating an example of the capacity information stored in the capacity information storing unit 263 according to this embodiment. Although the capacity information includes a machine ID, color printing or monochrome printing, duplex printing or one-side printing, with or without sorting, with or without a staple, with or without a punch, and CPU information in the example shown in FIG. 10, the capacity information is not limited thereto. Note that color printing and monochrome printing can be executed when "color" is set in the section of color printing or monochrome printing. Note also that duplex printing and one-side printing can be executed when "duplex" is set in the section of duplex printing or one-side printing. Note also that the machine ID "MFP0" herein represents the main unit 11, the machine ID "MFP1" represents the slave machine 30-1, the machine ID "MFP2" represents the slave machine 30-2, the machine ID "MFP3" represents the slave machine 30-3, and the machine ID "MFP4" represents the slave machine 30-4. However, the present invention is not limited thereto. Furthermore, although the CPU information here indicates the processing capacity (specs) of the CPU (machine), the CPU information is not limited thereto.

The capacity information acquiring unit 265 of the server unit 20 acquires capacity information indicating at least executable functions in the slave machine 30-1 (an example of first capacity information) on the basis of the machine identification information of the slave machine 30-1 included in the distributed print execution request received by the identification information acquiring unit 257 (step S211).

When the machine identification information (machine ID) of the slave machine 30-1 is "MFP1" and the capacity information is the one shown in FIG. 10, the capacity information acquiring unit 265 acquires the capacity information of the machine ID "MFP1" from the capacity information storing unit 263.

In this embodiment, on the basis of one or more pieces of machine identification information included in the job information acquired by the job information acquiring unit 259, the capacity information acquiring unit 265 acquires capacity information (an example of second capacity information) for each of the one or more machines indicated by the one or more pieces of machine identification information.

For example, in case of the job information of the job ID "JOB10035" shown in FIG. 7 and the capacity information shown in FIG. 10, the capacity information acquiring unit 265 acquires, on the basis of the print-executing machine ID "MFP0," the capacity information of the machine ID "MFP0" from the capacity information storing unit 263.

On the basis of the used function information acquired by the used function information acquiring unit 261 and the capacity information acquired by the capacity information acquiring unit 265, the executability determining unit 267 of the server unit 20 determines if the job indicated by the job identification information of the job information acquired by the job information acquiring unit 259 can be executed by the slave machine 30-1 (step S213).

Specifically, the executability determining unit 267 determines that the slave machine 30-1 can execute the job if the capacity information of the slave machine 30-1 meets the used function information. The executability determining unit 267 determines that the slave machine 30-1 is unable to execute the job if the capacity information of the slave machine 30-1 fails to meet the used function information. In case of the used function information of the job ID "JOB10035" shown in FIG. 8 and the capacity information of the machine ID "MFP1" shown in FIG. 10, the capacity information satisfies all functions in the used function information, i.e., color printing or monochrome printing, duplex printing or one-side printing, with or without sorting, with or without a staple, and with or without a punch. Thus, the executability determining unit 267 determines that the slave machine 30-1 can execute the job of the job ID "JOB10035."

If the executability determining unit 267 determines that the slave machine 30-1 can execute the job, the job control unit 251 notifies the mobile terminal 40 of the acceptance of the distributed print (step S215).

Moreover, if the executability determining unit 267 determines that the slave machine 30-1 can execute the job, the processing count information acquiring unit 269 of the server unit 20 acquires, on the basis of one or more pieces of machine identification information included in the job information acquired by the job information acquiring unit 259, executed processing count information from each of the one or more machines indicated by the one or more pieces of machine identification information. The executed processing count information refers to information indicating the number of processings having been executed among processings constituting a job. In this embodiment, the executed processing count information indicates the number of sets having been printed.

For example, in case of the job information of the job ID "JOB10035" shown in FIG. 7, the processing count information acquiring unit 269 transmits a request for executed processing count information to the main unit 11 on the basis of the print-executing machine ID "MFP0" (step S217). If the communication unit 157 of the main unit 11 receives the request for executed processing count information from the server unit 20, the communication unit 157 acquires the executed processing count information from the storage unit 155 and transmits such information to the server unit 20 (step S219).

If the executability determining unit 267 determines that the slave machine 30-1 can execute the job, the determining unit 271 of the server unit 20 determines, on the basis of one or more pieces of executed processing count information acquired by the processing count information acquiring unit 269, the number of processings to be performed by each of the slave machine 30-1 and the one or more machines indicated by the one or more pieces of machine identification information included in the job information acquired by the job information acquiring unit 259 (step S221).

Specifically, on the basis of the capacity information of the slave machine 30-1 acquired by the capacity information acquiring unit 265, the capacity information of each of the one or more machines acquired by the capacity information acquiring unit 265, and the one or more pieces of executed processing count information acquired by the processing count information acquiring unit 269, the determining unit 271 determines the number of processings to be performed by each of the slave machine 30-1 and the one or more machines indicated by the one or more pieces of machine identification information included in the job information acquired by the job information acquiring unit 259.

For example, assume a case where: job information is the one regarding the job ID "JOB10035" shown in FIG. 7 and capacity information is the one shown in FIG. 10; the CPU information of the slave machine 30-1 is "1 GHz"; the CPU information of the main unit 11 is "2 GHz"; and executed processing count information in the main unit 11, acquired by the processing count information acquiring unit 269, is "30 sets." In this case, the number of unprinted sets equals 120 (150−30) sets. In order to satisfy the 1:2 ratio between the number of unprinted sets to be allocated to the slave machine 30-1 and that to be allocated to the main unit 11 on the basis of the CPU information, the determining unit 271 determines that 40 (120×⅓) sets are printed by the slave machine 30-1 and 110 (120×⅔+30) sets (the number of unprinted sets in the main unit 11 is given by 120×⅔=80 sets) are printed by the main unit 11.

Note that the present invention is not limited thereto. Without consideration of the CPU information, the determining unit 271 may determine that 60 (120×½) sets are printed by the slave machine 30-1 and 90 (120×½+30) sets (the number of unprinted sets in the main unit 11 is given by 120×½=60 sets) are printed by the main unit 11 so that the ratio between the number of unprinted sets to be allocated to the slave machine 30-1 and that to be allocated to the main unit 11 simply satisfies 1:1.

If the executability determining unit 267 determines that the slave machine 30-1 can execute the job, the job control unit 251 causes the job, which is indicated by the job identification information included in the job information acquired by the job information acquiring unit 259, to be distributed to and executed by the slave machine 30-1. Specifically, on the basis of the number of processings to be performed by each of the slave machine 30-1 and the one or more machines indicated by the one or more pieces of machine identification information included in the job information acquired by the job information acquiring unit 259, the job control unit 251 causes the job to be distributed to and executed by the slave machine 30-1 and the one or more machines.

For example, if the determining unit 271 determines that 40 sets are printed by the slave machine 30-1 and 110 sets are printed by the main unit 11, the job control unit 251 transmits, to the main unit 11, a request for changing the number of sets, which includes the determined (changed) number of sets for the main unit 11 (step S223). The job control unit 251 then transmits, to the slave machine 30-1, a print execution request including the print data included in the job information acquired by the job information acquiring unit 259 and the determined number of sets for the slave machine 30-1 (step S225).

If the communication unit 157 of the main unit 11 receives the request for changing the number of sets from the server unit 20, the job execution unit 159 changes the number of sets for the print job in execution (step S227). If the communication unit 355-1 of the slave machine 30-1 receives the print execution request from the server unit 20, the job execution unit 357-1 generates executed processing count information, which indicates the number of sets having been printed, and stores such information in the storage unit 353-1 while executing the print job of printing the print data for the number of sets (step S229).

The job control unit 251 also updates the job information acquired by the job information acquiring unit 259 and stores the updated information in the job information storing unit 253 (step S231). For example, assume a case where: job information is the one regarding the job ID "JOB10035" shown in FIG. 7; the number of sets for the slave machine 30-1 is 40; and the number of sets for the main unit 11 is 110. In this case, the job control unit 251 then updates the job information by changing the number of sets associated with the print-executing machine ID "MFP0" in the job information of the job ID "JOB10035" to "110" and by adding the print-executing machine ID "MFP1" and "40" as the number of sets associated with such "MFP1."

According to this embodiment, the operation of newly adding a machine to achieve the distributed processing of a job can be performed from a mobile terminal as described above. Thus, the ease of operation in newly adding a machine to achieve the distributed processing of a job can be enhanced.

Modified Example 1

Job redistribution performed when an error occurs in any of the machines in the above-described embodiment during the distributed processing of a job will now be described. In the modified example 1, the slave machine 30-3 is further added to the situation of the above-described embodiment and a print job is also distributed to and parallel-processed by the slave machine 30-3. It is also assumed that the job information of the job ID "JOB10035" is as shown in FIG. 11. The description about the operation of allowing the slave machine 30-3 to work in cooperation with the main unit 11 and the slave machine 30-1 and causing a print job to be distributed to and parallel-processed by the slave machine 30-3 will be omitted since such an operation is the same as the case of the slave machine 30-1 described in the above-described embodiment except that the operation performed on the main unit 11 is also performed on the slave machine 30-1.

FIG. 12 is a sequence diagram illustrating an example of a job redistributing operation upon the occurrence of an error according to the modified example 1.

First, based on one or more pieces of machine identification information included in job information stored in the job information storing unit 253, the job control unit 251 regularly checks if an error has occurred in each of the one or more machines indicated by the one or more pieces of machine identification information.

For example, in case of the job information of the job ID "JOB10035" shown in FIG. 11, the job control unit 251 performs an error check by polling on the main unit 11, which is indicated by the print-executing machine ID "MFP0," to confirm no error (steps S301 and S303). The job control unit 251 also performs an error check by polling on the slave machine 30-1, which is indicated by the print-executing machine ID "MFP1," to confirm no error (steps S305 and S307). The job control unit 251 also performs an error check by polling on the slave machine 30-3, which is indicated by the print-executing machine ID "MFP3," to confirm no error (steps S309 and S311).

If an error has occurred in any one of the one or more machines indicated by the one or more pieces of machine identification information, the processing count information acquiring unit 269 acquires executed processing count information from each of the one or more machines indicated by the one or more pieces of machine identification information.

For example, in case of the job information of the job ID "JOB10035" shown in FIG. 11, the processing count information acquiring unit 269 transmits the request for executed processing count information to each of the main unit 11 and the slave machines 30-1 and 30-3 and acquires the executed processing count information therefrom (steps S313 to S323).

On the basis of the one or more pieces of executed processing count information, the determining unit 271 determines the number of processings for each of the one or more machines indicated by the one or more pieces of machine identification information except for the machine where the error has occurred (step S325).

For example, assume a case where: job information is the one regarding the job ID "JOB10035" shown in FIG. 11 and capacity information is the one shown in FIG. 10; the CPU information of the main unit 11 is "2 GHz"; the CPU information of the slave machine 30-1 is "1 GHz"; the CPU information of the slave machine 30-3 is "1 GHz"; executed processing count information in the main unit 11 is "76 sets"; executed processing count information in the slave machine 30-1 is "23 sets"; and executed processing count information in the slave machine 30-3 is "3 sets." In this case, since the number of unprinted sets equals 48 (150−76−23−3) sets and an error has occurred in the slave machine 30-3, the determining unit 271 determines that 39 (23+48×⅓) sets are printed by the slave machine 30-1 and 108 (76+48×⅔) sets are printed by the main unit 11 on the basis of the CPU information so that the ratio between the number of unprinted sets to be allocated to the slave machine 30-1 and that to be allocated to the main unit 11 satisfies 1:2.

On the basis of the number of processings for each of the one or more machines indicated by the one or more pieces of machine identification information except for the machine where the error has occurred, the job control unit 251 causes the job to be distributed to and executed by the one or more machines indicated by the one or more pieces of machine identification information except for the machine where the error has occurred.

For example, if the determining unit 271 determines that 39 sets are printed by the slave machine 30-1 and 108 sets are printed by the main unit 11, the job control unit 251 transmits, to the main unit 11, a request for changing the number of sets, which includes the determined (changed) number of sets for the main unit 11 (step S327). The job control unit 251 then transmits, to the slave machine 30-1, a request for changing the number of sets, which includes the determined (changed) number of sets for the slave machine 30-1 (step S329).

If the communication unit 157 of the main unit 11 receives the request for changing the number of sets from the server unit 20, the job execution unit 159 changes the number of sets for the print job in execution (step S331). If the communication unit 355-1 of the slave machine 30-1 receives the request for changing the number of sets from the server unit 20, the job execution unit 357-1 changes the number of sets for the print job in execution (step S333), and the job control unit 251 updates the job information.

For example, assume a case where: job information is the one regarding the job ID "JOB10035" shown in FIG. 11; the number of sets for the main unit 11 is 108; the number of sets for the slave machine 30-1 is 39; and the number of sets for the slave machine 30-3 is 3. In this case, the job control unit 251 then changes the number of sets associated with the print-executing machine ID "MFP0" in the job information of the job ID "JOB10035," the number of sets associated with the print-executing machine ID "MFP1," and the number of sets associated with the print-executing machine ID "MFP3" to "108," "39," and "3," respectively.

As described above, according to the modified example 1, when an error occurs in a machine performing the distributed processing of a job, the job allocated to such a machine is distributed to other machines also performing such distributed processing. Thus, even when an error occurs in a machine performing the distributed processing of a job, all distributed jobs can be executed.

Modified Example 2

A case in which the job redistributing operation upon the occurrence of an error is performed according to a user's instruction in the modified example 1 will now be described.

Figure 13:
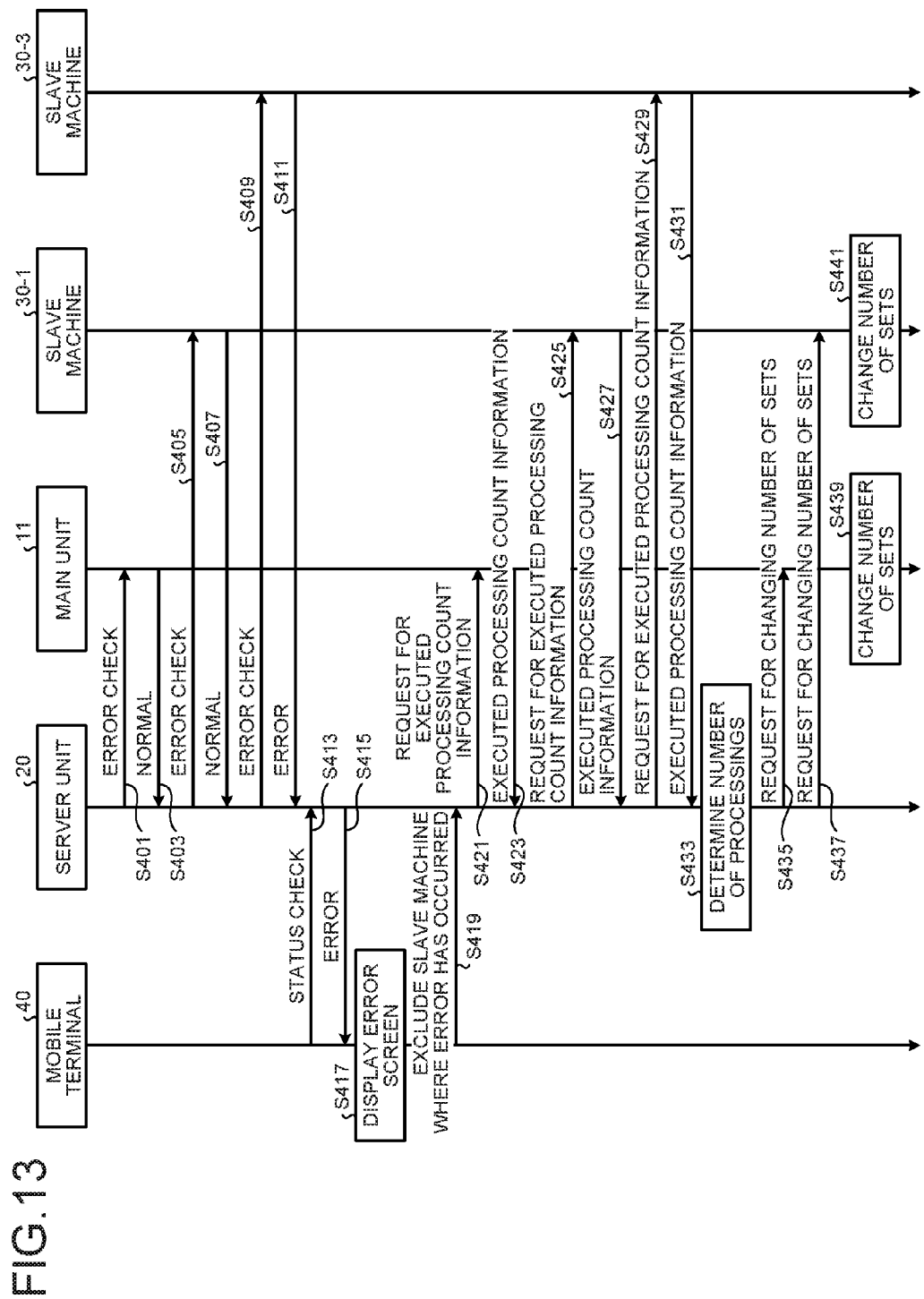
FIG. 13 is a sequence diagram illustrating an example of a job redistributing operation upon the occurrence of an error according to a modified example 2.

FIG. 13 is a sequence diagram illustrating an example of a job redistributing operation upon the occurrence of an error according to a modified example 2.

Processings from steps S401 to S411 are the same as those from the steps S301 to S311 in the sequence diagram shown in FIG. 12.

The job control unit 251 notifies the mobile terminal 40 that an error has occurred in at least any one of the one or more machines indicated by the one or more pieces of machine identification information included in the job information stored in the job information storing unit 253. The job control unit 251 then accepts, from the mobile terminal 40, an instruction regarding whether the machine where the error has occurred is to be excluded.

For example, the communication unit 459 of the mobile terminal 40 performs a status check on the server unit 20 by polling to confirm that the error has occurred in the at least any one of the one or more machines (steps S413 and S415).

If the communication unit 459 confirms that the error has occurred in the at least any one of the one or more machines, the display unit 453 displays an error screen to ask whether the machine where the error has occurred should be excluded (step S417). According to a user's operation, the operation unit 451 receives input of an instruction of the exclusion of the machine where the error has occurred. The communication unit 459 then notifies the server unit 20 of the exclusion of the machine where the error has occurred (step S419).

Note that if the operation unit 451 receives, according to a user's operation, input of an instruction of the non-exclusion of the machine where the error has occurred and the communication unit 459 notifies the server unit 20 that no machine where the error has occurred is excluded, the distributed processing is continued without change. The input of the non-exclusion of the machine where the error has occurred is performed, for example, when the user himself or herself fixes the error in the machine where the error has occurred.

If the instruction for excluding the machine where the error has occurred is accepted by the job control unit 251, the processing count information acquiring unit 269 acquires executed processing count information from each of the one or more machines indicated by the one or more pieces of machine identification information (steps S421 to S431).

Processings from steps S433 to S441 are the same as those from the steps S325 to S333 in the sequence diagram shown in FIG. 12.

As described above, according to the modified example 2, when an error occurs in a machine performing the distributed processing of a job, the job allocated to such a machine is distributed to other machines also performing the distributed processing according to a user's operation. Thus, even when an error occurs in a machine performing the distributed processing of a job, all distributed jobs can be executed.

Modified Example 3

In the above-described embodiment, whether a job can be distributed and executed may be determined in consideration of the remaining number of processings among the processings constituting the job.

Figure 14:
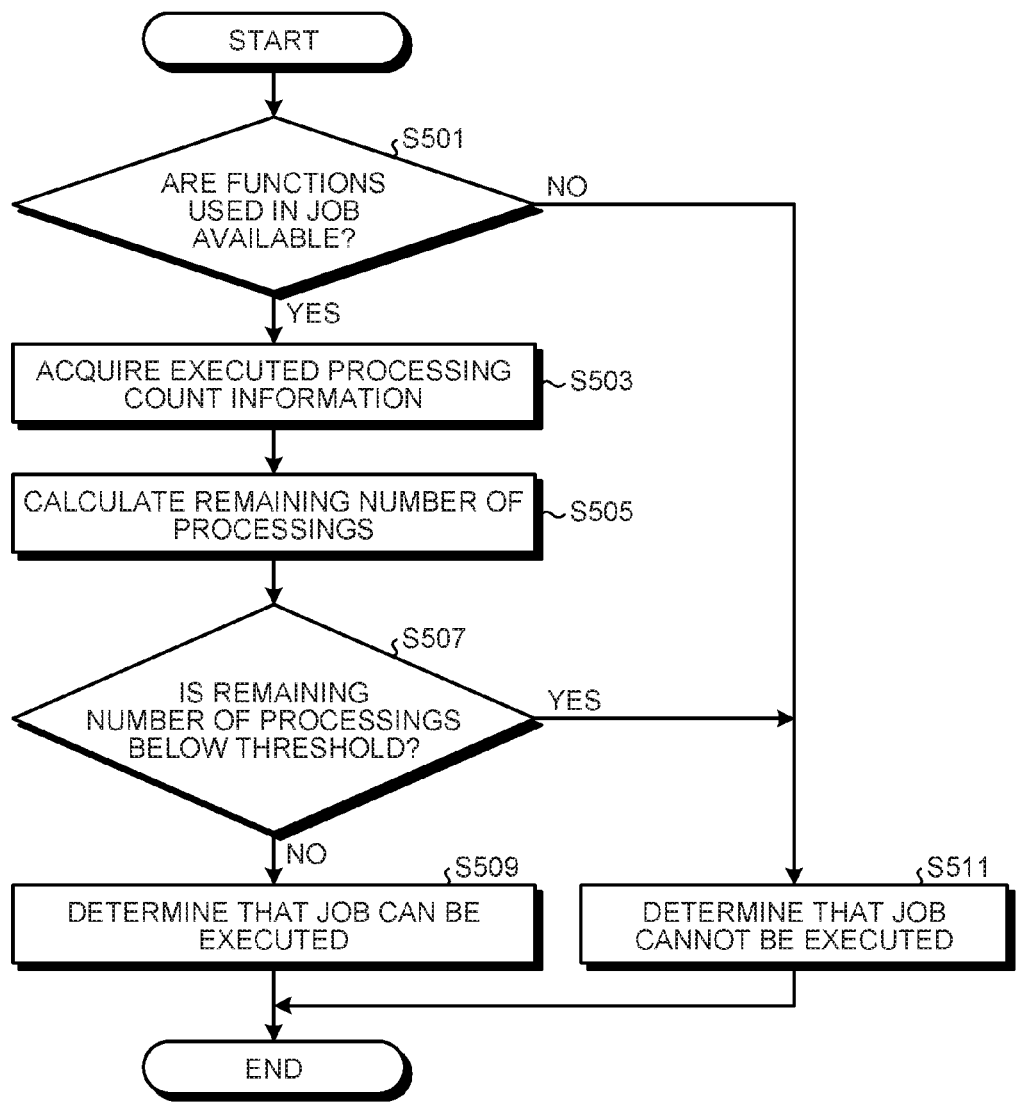
FIG. 14 is a flowchart illustrating an example of executability determination processing according to a modified example 3.

FIG. 14 is a flowchart illustrating an example of executability determination processing according to a modified example 3.

First, on the basis of the used function information acquired by the used function information acquiring unit 261 and the capacity information acquired by the capacity information acquiring unit 265, the executability determining unit 267 determines whether functions used in the job indicated by the job identification information in the job information acquired by the job information acquiring unit 259 can be executed by the slave machine 30-1 (step S501).

For example, in case of the used function information of the job ID "JOB10035" shown in FIG. 8 and the capacity information of the machine ID "MFP1" shown in FIG. 10, the capacity information satisfies all functions in the used function information, i.e., color printing or monochrome printing, duplex printing or one-side printing, with or without sorting, with or without a staple, and with or without a punch. Thus, the executability determining unit 267 determines that the slave machine 30-1 can execute the functions used in the job of the job ID "JOB10035."

When the slave machine 30-1 can execute the functions (Yes in step S501), the processing count information acquiring unit 269 acquires, on the basis of one or more pieces of machine identification information included in the job information acquired by the job information acquiring unit 259, executed processing count information from each of the one or more machines indicated by the one or more pieces of machine identification information (step S503).

Subsequently, the executability determining unit 267 acquires the number of sets associated with each of the one or more pieces of machine identification information included in the job information acquired by the job information acquiring unit 259. The executability determining unit 267 then calculates the remaining number of processings on the basis of the one or more numbers of sets (an example of processing count information) and the one or more pieces of executed processing count information acquired by the processing count information acquiring unit 269 (step S505).

For example, assume a case where job information is the one regarding the job ID "JOB10035" shown in FIG. 7 and executed processing count information in the main unit 11, acquired by the processing count information acquiring unit 269, is "130 sets." In this case, since the number of sets associated with the print-executing machine ID "MFP0" is "150," the remaining number of processings equals 20 (150–130) sets.

If the calculated remaining number of processings is no less than a threshold (No in step S507), the executability determining unit 267 determines that the slave machine 30-1 can execute the job (step S509). If the remaining number of processings is less than the threshold (Yes in the step S507), on the other hand, the executability determining unit 267 determines that the slave machine 30-1 is unable to execute the job (step S511). Note that the executability determining unit 267 determines that the slave machine 30-1 is unable to execute the job (step S511) also in the case of No in the step S501. The threshold may be included in the capacity information.

For example, if the remaining number of processings is 20 sets and the threshold is 30 sets, it is determined that the slave machine 30-1 is unable to execute the job. If the remaining number of processings is 20 sets and the threshold is 15 sets, it is determined that the slave machine 30-1 can execute the job.

As described above, according to the modified example 3, the distributed processing of a job is prevented from occurring when there is no advantage in the distributed processing of the job (e.g., its printing efficiency is lowered) such as when the remaining number of processings among the processings constituting the job is small.

Modified Example 4

In the above-described embodiment, whether a job can be distributed and executed may be determined in consideration of the generation of a machine.

FIG. 15 is a diagram illustrating an example of capacity information stored in the capacity information storing unit 263 according to a modified example 4. The capacity information shown in FIG. 15 differs from the capacity information shown in FIG. 10 in the inclusion of generation numbers. The generation numbers indicate the generations of the machines, and a larger number indicates a newer generation here.

Figure 16:
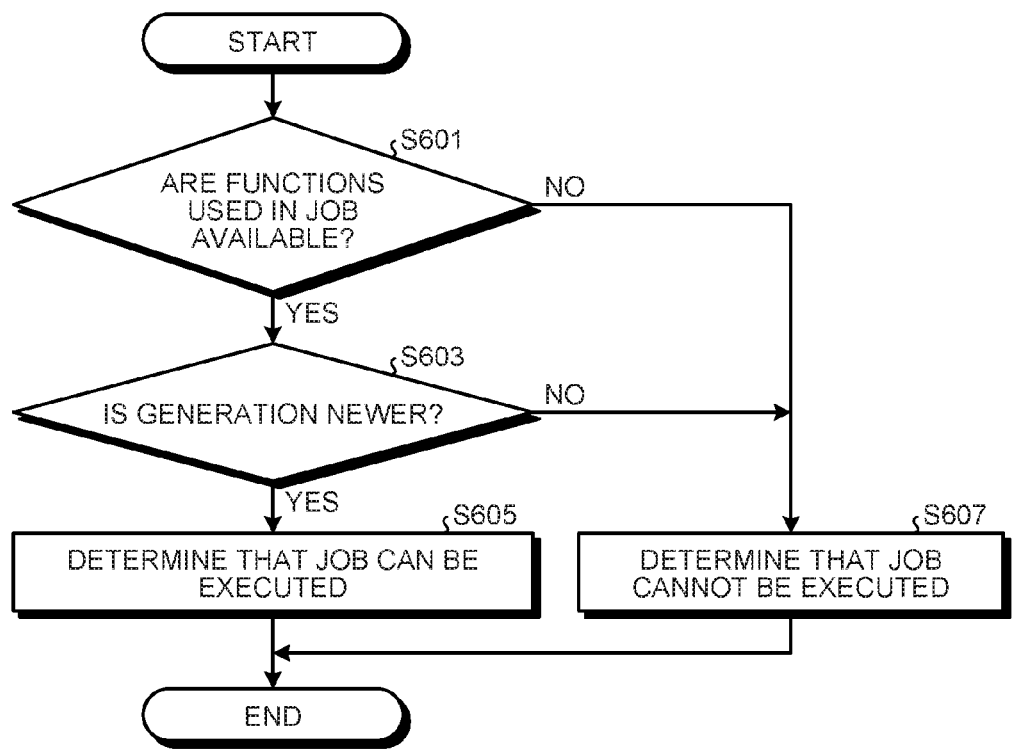
FIG. 16 is a flowchart illustrating an example of executability determination processing according to the modified example 4.

FIG. 16 is a flowchart illustrating an example of executability determination processing according to the modified example 4.

First, on the basis of the used function information acquired by the used function information acquiring unit 261 and the capacity information acquired by the capacity information acquiring unit 265, the executability determining unit 267 determines whether functions used in the job indicated by the job identification information in the job information acquired by the job information acquiring unit 259 can be executed by the slave machine 30-1 (step S601).

For example, in case of the used function information of the job ID "JOB10035" shown in FIG. 8 and the capacity information of the machine ID "MFP1" shown in FIG. 15, the capacity information satisfies all functions in the used function information, i.e., color printing or monochrome printing, duplex printing or one-side printing, with or without sorting, with or without a staple, and with or without a punch. Thus, the executability determining unit 267 determines that the slave machine 30-1 can execute the functions used in the job of the job ID "JOB10035."

When the slave machine 30-1 can execute the functions (Yes in step S601), the executability determining unit 267 compares the generation number in the capacity information of the slave machine 30-1 acquired by the capacity information acquiring unit 265 to the generation number in the capacity information acquired by the capacity information acquiring unit 265 for each of the one or more machines indicated by the one or more pieces of machine identification information included in the job information acquired by the job information acquiring unit 259 (step S603).

If the generation number of the slave machine 30-1 is newer than any generation number in the one or more machines (Yes in step S603), the executability determining unit 267 determines that the slave machine 30-1 can execute the job (step S605). If the generation number of the slave machine 30-1 is older than any one of the one or more generation numbers for the one or more machines (No in step S603), the executability determining unit 267 determines that the slave machine 30-1 is unable to execute the job (step S607). Note that the executability determining unit 267 determines that the slave machine 30-1 is unable to execute the job (step S607) also in the case of No in the step S601.

For example, in case of the job information regarding the job ID "JOB10035" shown in FIG. 7 and the capacity information shown in FIG. 15, the generation number of the slave machine 30-1 is newer than the generation number of the main unit 11. Thus, it is determined that the slave machine 30-1 can execute the job. Note that if the generation number of the slave machine 30-1 is older than the generation number of the main unit 11, it is determined that the slave machine 30-1 is unable to execute the job.

As described above, according to the modified example 4, unless a newly-joined machine has a generation newer than that of a machine already executing a job, the job cannot be distributed to the newly-joined machine. Thus, this allows for restricted use suited for an operational or billing system for allowing the distributed print function to be used by a newer-generation machine.

In the modified example 4, the distribution of a job is prohibited unless a newly-joined machine has a generation newer than that of a machine already executing the job. However, the distribution of a job may be prohibited unless a newly-joined machine has a generation older than that of a machine already executing the job. This allows for restricted use suited for an operational or billing system for allowing the distributed print function to be used by an older-generation machine.

Modified Example 5

In the above-described embodiment, the authentication unit 153 of the main unit 11 may be used to authenticate a user who uses the mobile terminal 40 also when the slave machine 30 is joined to work in cooperation.

Figure 17:
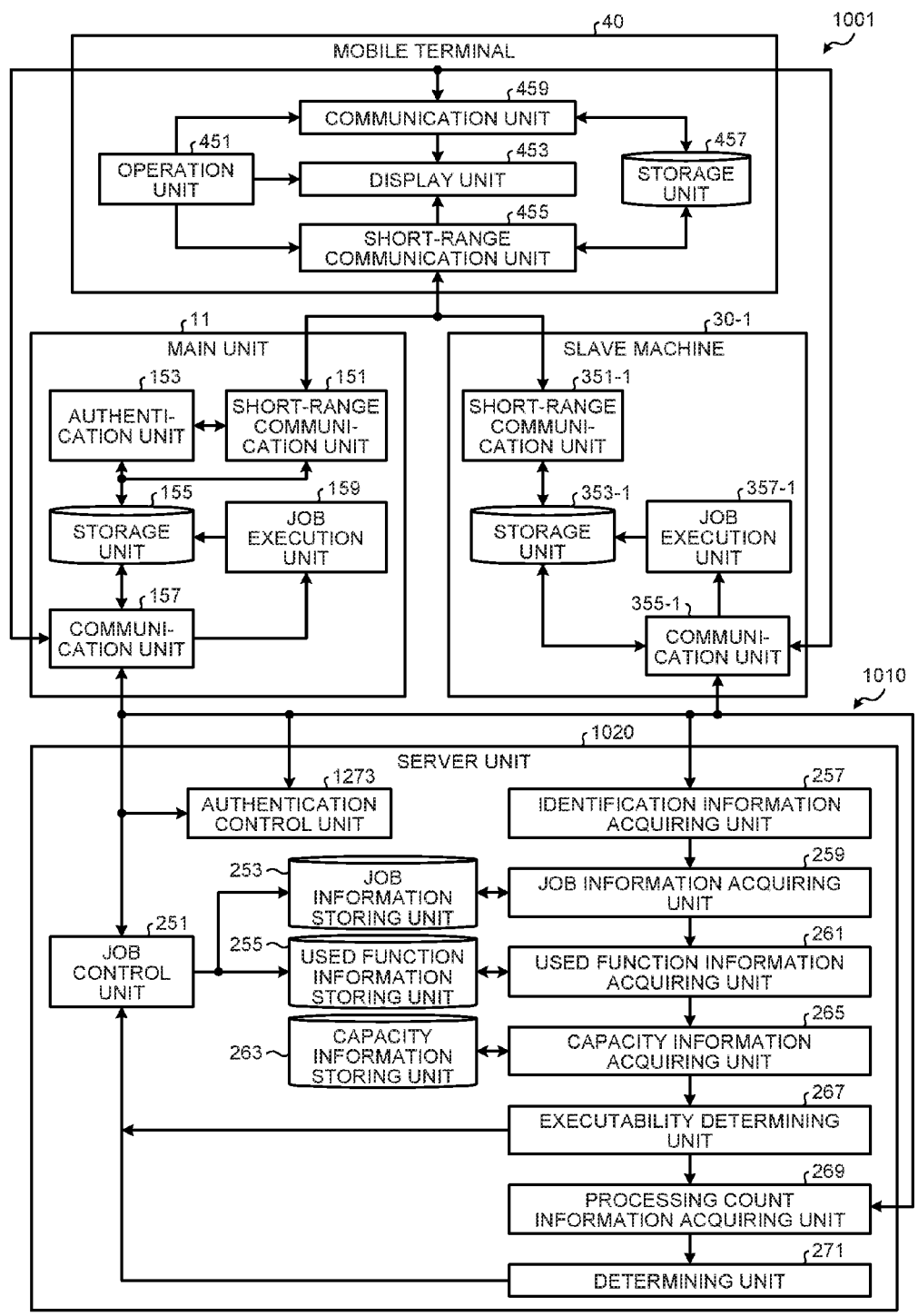
FIG. 17 is a block diagram illustrating an example of the functional configuration of a main unit and a server unit in a master machine, a slave machine, and a mobile terminal in a distributed processing system according to a modified example 5.

FIG. 17 is a block diagram illustrating an example of the functional configuration of the main unit 11 and a server unit 1020 in a master machine 1010, the slave machine 30-1, and the mobile terminal 40 in a distributed processing system 1001 according to a modified example 5. As illustrated in FIG. 17, an authentication control unit 1273 in the server unit 1020 is different from the above-described embodiment.

Figure 18:
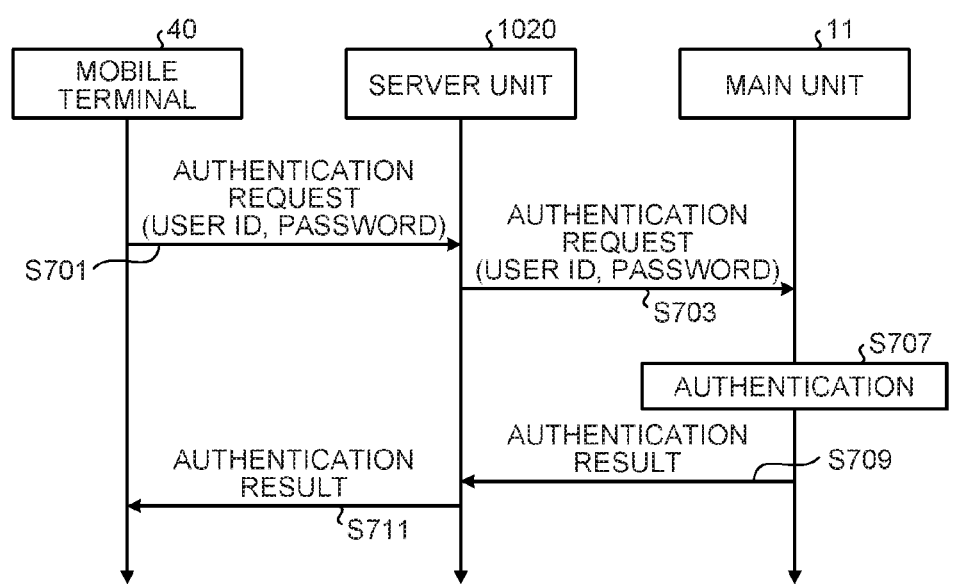
FIG. 18 is a sequence diagram illustrating an example of processing for authenticating a user who uses a mobile terminal when a slave machine is joined to work in cooperation according to the modified example 5.

FIG. 18 is a sequence diagram illustrating an example of processing for authenticating a user who uses the mobile terminal 40 when the slave machine 30-1 is joined to work in cooperation according to the modified example 5. Such processing is executed during the steps S203 and S205 in the sequence diagram shown in FIG. 9.

If the short-range communication unit 455 of the mobile terminal 40 receives the machine identification information of the slave machine 30-1 and the IP address of the server unit 1020, the display unit 453 displays an authentication information entry screen. According to a user's operation, the operation unit 451 receives input of a user ID and a password (an example of user authentication information) for identifying the user who uses the mobile terminal 40.

On the basis of the IP address of the server unit 1020, the communication unit 459 transmits, to the server unit 1020, an authentication request including the user ID and the password input from the operation unit 451 (step S701). The authentication control unit 1273 of the server unit 1020 submits the received authentication request to the main unit 11 (step S703).

If the communication unit 157 of the main unit 11 receives the authentication request from the server unit 1020, the communication unit 157 stores, in the storage unit 155, the user ID and the password included in the authentication request. The authentication unit 153 acquires the user ID and the password from the storage unit 155 and authenticates the user using the account information stored in the storage unit 155 (step S707).

The communication unit 157 of the main unit 11 then transmits the authentication result to the server unit 1020 (step S709). The authentication control unit 1273 of the server unit 1020 transmits the authentication result to the mobile terminal 40 (step S711).

When the authentication result indicates successful authentication, the communication unit 459 of the mobile terminal 40 transmits, to the server unit 1020, a distributed print execution request including the mobile terminal identification information of the mobile terminal 40 and the machine identification information of the slave machine 30-1 on the basis of the IP address of the server unit 1020. The identification information acquiring unit 257 of the server unit 1020 receives the distributed print execution request from the mobile terminal 40. Note that when the authentication result indicates authentication failure, the communication unit 459 of the mobile terminal 40 transmits no distributed print execution request to the server unit 1020.

As described above, according to the modified example 5, a user who uses the mobile terminal 40 can be authenticated even when the slave machine 30 has no authentication function, thus improving security.

Modified Example 6

Figure 19:
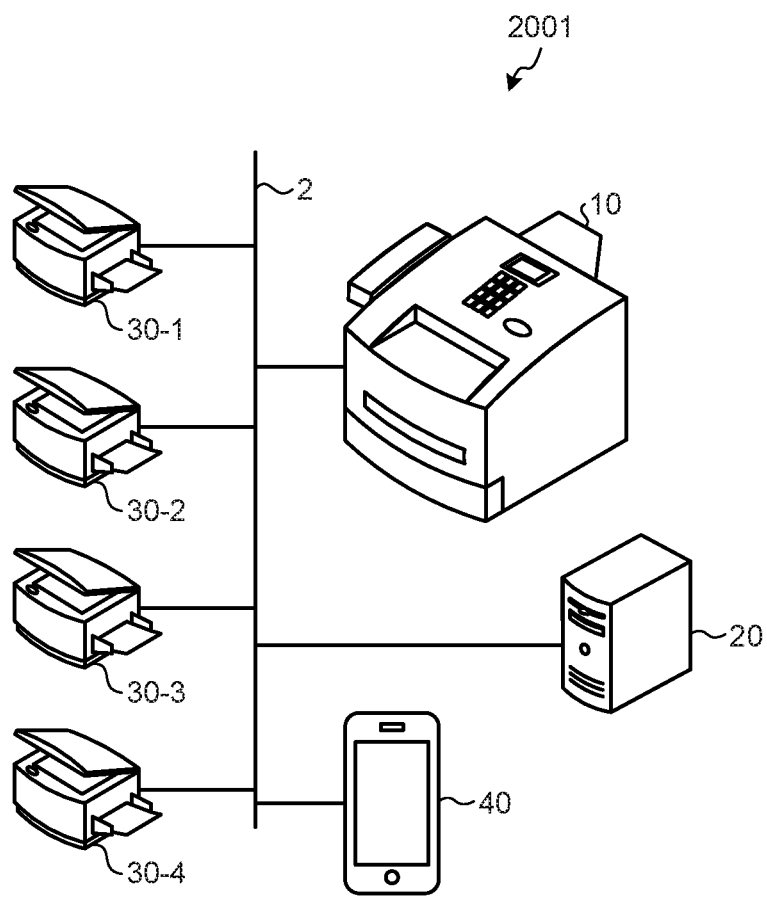
FIG. 19 is a schematic diagram illustrating an example of a distributed processing system according to a modified example 6.

The above-mentioned embodiment has been described with reference to, as an example, the case where the server unit 20 is built into the master machine 10 and internally connected to the main unit 11. As in a distributed processing system 2001 shown in FIG. 19, the server unit 20 may be connected to the network 2 from the outside of the master machine 10, and the server unit 20 and the master machine 10 may be connected to each other via the network 2. In this case, the master machine 10 corresponds to the main unit 11.

Modified Example 7

The above-mentioned embodiment has been described with reference to, as an example, the case where the short-range wireless communication is established between the mobile terminal 40 and the main unit 11 or the slave machine 30. This may be replaced, for example, by a method in which a QR code (registered trademark) displayed on the display unit 453 of the mobile terminal 40 is scanned by the main unit 11 or the slave machine 30.

(Program)

Programs to be executed by the main unit, the server units, the slave machines, and the mobile terminal in the above-described embodiments and the modified examples (hereinafter, referred to as the "devices in the above-described embodiments and the modified examples") are stored and provided, as installable or executable files, in a computer-readable storage medium such as a CD-ROM, a CD-R, a memory card, a digital versatile disk (DVD), or a flexible disk (FD).

Alternatively, the programs to be executed by the devices in the above-described embodiments and the modified examples may be stored on a computer connected to a network such as the Internet and may be provided by means of downloading via the network. Alternatively, the devices in the above-described embodiments and the modified examples may be provided or distributed via a network such as the Internet. Alternatively, the programs to be executed by the devices in the above-described embodiments and the modified examples may be pre-installed, for example, in a ROM and then provided.

The programs to be executed by the devices in the above-described embodiments and the modified examples are modularly-configured to implement the aforementioned units on a computer. For example, a CPU, as an actual hardware, reads out such programs from a ROM onto a RAM, and executes the programs to implement the aforementioned functional units on the computer.

An embodiment provides an advantageous effect that the ease of operation when a machine is newly added to perform the distributed processing of a job can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a memory having computer readable instructions stored thereon; and
   at least one processor configured to execute the computer readable instructions to,
   acquire, from a mobile terminal having acquired, from a machine, first machine identification information for identifying the machine by wireless communication, mobile terminal identification information for identifying the mobile terminal and the first machine identification information;
   acquire, on a basis of the mobile terminal identification information, job information including at least job identification information for identifying a job being executed in another machine according to an instruction from the mobile terminal;
   acquire, on a basis of the job identification information, used function information indicating a function to be used in the job;
   acquire, on a basis of the first machine identification information, first capacity information at least indicating a function executable by the machine;
   determines, on a basis of the used function information and the first capacity information, whether the machine can execute the job; and
   causes, when the job can be executed, the job to be distributed to and executed by the machine.

2. The information processing device according to claim 1, wherein
   the job is executed by one or more other machines,
   the job information further includes, for each of the one or more other machines, second machine identification information for identifying the other machine; and
   the at least one processor is further configured to,
   acquire, on a basis of one or more pieces of second machine identification information, executed processing count information indicating number of processings having been executed among processings constituting the job from each of the one or more other machines,
   determine, when the job can be executed, number of processings to be performed by each of the machine and the one or more other machines on a basis of the one or more pieces of executed processing count information, and
   cause the job to be distributed to and executed by the machine and the one or more other machines on a basis of the number of processings for each of the machine and the one or more other machines.

3. The information processing device according to claim 2, wherein
   the first capacity information further indicates processing capacity of the machine; and
   the at least one processor is further configured to,
   acquire, for each of the one or more other machines, second capacity information indicating a function executable by the other machine and processing capacity of the other machine on the basis of the one or more pieces of second machine identification information, and
   determine the number of processings for each of the machine and the one or more other machines on a basis of the first capacity information, the one or more pieces of second capacity information, and the one or more pieces of executed processing count information.

4. The information processing device according to claim 2, wherein the at least one processor is further configured to:
   regularly checks if an error has occurred for each of the machine and the one or more other machines;
   acquire, when an error has occurred in at least any one of the machine and the one or more other machines, executed processing count information from each of the machine and the one or more other machines;
   determine a number of processings for each of the machine and the one or more other machines excluding a machine where the error has occurred on a basis of the one or more pieces of executed processing count information; and
   cause the job to be distributed to and executed by the machine and the one or more other machines excluding the machine where the error has occurred on a basis of the number of processings for each of the machine and the one or more other machines excluding the machine where the error has occurred.

5. The information processing device according to claim 4, wherein the at least one processor is further configured to:
   notify the mobile terminal of occurrence of the error in at least any one of the machine and the one or more other machines and then accepts, from the mobile terminal, an instruction regarding whether the machine where the error has occurred is to be excluded; and acquire, when an instruction for excluding the machine where the error has occurred is accepted, the executed processing count information from each of the machine and the one or more other machines.

6. The information processing device according to claim 2, wherein the job information further includes processing count information indicating, for each of the one or more other machines, the number of processings for the other machine; and the at least one processor is further configured to determines whether the machine can execute the job on a basis of remaining number of processings among the processings constituting the job, obtained from the one or more pieces of executed processing count information and the processing count information, and a threshold.

7. The information processing device according to claim 2, wherein the first capacity information further indicates a generation of the machine;

the at least one processor is further configured to, acquires, for each of the one or more other machines, second capacity information indicating a function executable by the other machine and a generation of the other machine on the basis of the one or more pieces of second machine identification information, and determine whether the machine can execute the job also on a basis of the generation indicated by the first capacity information and the generation indicated by each of the one or more pieces of second capacity information.

8. The information processing device according to claim 1, wherein the at least one processor is further configured to:

acquire, from the mobile terminal, authentication information of a user having the mobile terminal, requests authentication using the authentication information from a machine having an authentication function, and acquires an authentication result; and acquire, when the authentication result indicates successful authentication, the mobile terminal identification information and the first machine identification information from the mobile terminal.

9. The information processing device according to claim 1, wherein the machine is an image forming device.

10. The information processing device according to claim 1, wherein the information processing device is internally or externally connected to at least any one of the machine and the one or more other machines, and connected to the machine and the one or more other machines via a network.

11. The information processing device according to claim 1, wherein the information processing device is connected to the machine and the one or more other machines via a network.

12. A distributed processing method comprising:

acquiring, from a mobile terminal having acquired, from a machine, first machine identification information for identifying the machine by wireless communication, mobile terminal identification information for identifying the mobile terminal and the first machine identification information;

acquiring, on a basis of the mobile terminal identification information, job information including at least job identification information for identifying a job being executed in another machine according to an instruction from the mobile terminal;

acquiring, on a basis of the job identification information, used function information indicating a function to be used in the job;

acquiring, on a basis of the first machine identification information, first capacity information at least indicating a function executable by the machine;

determining executability to determine, on a basis of the used function information and the first capacity information, whether the machine can execute the job; and controlling the job to cause, when the job can be executed, the job to be distributed to and executed by the machine.

13. The distributed processing method according to claim 12, wherein the job is executed by one or more other machines, the job information further includes, for each of the one or more other machines, second machine identification information for identifying the other machine, the distributed processing method further comprises:

acquiring, on a basis of the one or more pieces of second machine identification information, executed processing count information indicating number of processings having been executed among processings constituting the job from each of the one or more other machines; and determining, when the job can be executed, number of processings to be performed by each of the machine and the one or more other machines on a basis of the one or more pieces of executed processing count information, and at the controlling of the job, the job is made to be distributed to and executed by the machine and the one or more other machines on a basis of the number of processings for each of the machine and the one or more other machines.

14. The distributed processing method according to claim 13, wherein the first capacity information further indicates processing capacity of the machine, at the acquiring of the capacity information, for each of the one or more other machines, second capacity information indicating a function executable by the other machine and processing capacity of the other machine is further acquired on the basis of the one or more pieces of second machine identification information, and at the determining of the number of processings, the number of processings for each of the machine and the one or more other machines is determined on a basis of the first capacity information, the one or more pieces of second capacity information, and the one or more pieces of executed processing count information.

15. The distributed processing method according to claim 13, wherein at the controlling of the job, if an error has occurred is regularly checked for each of the machine and the one or more other machines, at the acquiring of the processing count information, when an error has occurred in at least any one of the machine and the one or more other machines, executed processing count information is acquired from each of the machine and the one or more other machines, at the determining of the number of processings, number of processings for each of the machine and the one or more other machines excluding an machine where the error has occurred is determined on a basis of the one or more pieces of executed processing count information, and at the controlling of the job, the job is made to be distributed to and executed by the machine and the one or more other machines excluding the machine where the error has occurred on a basis of the number of processings for each of the machine and the one or more other machines excluding the machine where the error has occurred.

16. The distributed processing method according to claim 15, wherein at the controlling of the job, the mobile terminal is notified of occurrence of the error in at least any one of the machine and the one or more other machines and then an instruction regarding whether the machine where the error has occurred is to be excluded is accepted from the mobile terminal, and at the acquiring of the processing count information, when an instruction for excluding the machine where the error has occurred is accepted at the controlling of the job, the executed processing count information is acquired from each of the machine and the one or more other machines.

17. The distributed processing method according to claim 13, wherein the job information further includes processing count information indicating, for each of the one or more other machines, number of processings for the other machine, and at the determining of the executability, whether the machine can execute the job is determined also on a basis of remaining number of processings among the processings constituting the job, obtained from the one or more pieces of executed processing count information and the processing count information, as well as a threshold.

18. The distributed processing method according to claim 13, wherein the first capacity information further indicates a generation of the machine, at the acquiring of the capacity information, for each of the one or more other machines, second capacity information indicating a function executable by the other machine and a generation of the other machine is further acquired on the basis of the one or more pieces of second machine identification information, and at the determining of the executability, whether the machine can execute the job is determined also on a basis of the generation indicated by the first capacity information and the generation indicated by each of the one or more pieces of second capacity information.

19. The distributed processing method according to claim 12, further comprising:

acquiring, from the mobile terminal, authentication information of a user having the mobile terminal, requesting authentication using the authentication information from a machine having an authentication function, and acquiring an authentication result, wherein at the acquiring of the identification information, when the authentication result indicates successful authentication, the mobile terminal identification information and the first machine identification information are acquired from the mobile terminal.

20. A non-transitory computer-readable storage medium containing an information processing program, the program causing a computer to execute:

acquiring, from a mobile terminal having acquired, from a machine, first machine identification information for identifying the machine by wireless communication, mobile terminal identification information for identifying the mobile terminal and the first machine identification information;

acquiring, on a basis of the mobile terminal identification information, job information including at least job identification information for identifying a job being executed in another machine according to an instruction from the mobile terminal;

acquiring, on a basis of the job identification information, used function information indicating a function to be used in the job;

acquiring, on a basis of the first machine identification information, first capacity information at least indicating a function executable by the machine;

determining executability to determine, on a basis of the used function information and the first capacity information, whether the machine can execute the job; and controlling the job to cause, when the job can be executed, the job to be distributed to and executed by the machine.

* * * * *